United States Patent [19]

Ishida et al.

[11] Patent Number: 5,554,440
[45] Date of Patent: Sep. 10, 1996

[54] MAGNETIC RECORDING MEDIUM AND METHOD FOR PRODUCING THE SAME

[75] Inventors: Tatsuaki Ishida; Ryuji Sugita; Kiyokazu Tohma; Yasuaki Ban, all of Osaka, Japan

[73] Assignee: Matsushita Electric Industrial Co., Ltd., Osaka-Fu, Japan

[21] Appl. No.: 118,326

[22] Filed: Sep. 9, 1993

[30] Foreign Application Priority Data

Sep. 9, 1992 [JP] Japan ................................. 4-240540
Dec. 25, 1992 [JP] Japan ................................. 4-357981
Apr. 13, 1993 [JP] Japan ................................. 5-85916

[51] Int. Cl.⁶ .............................. G11B 5/66; G11B 5/70
[52] U.S. Cl. .............. 428/336; 428/649 T; 428/694 TS; 428/694 SL; 428/900
[58] Field of Search .................... 428/694 T, 694 TS, 428/694 SL, 694PR, 469, 336, 900

[56] References Cited

U.S. PATENT DOCUMENTS

| | | | |
|---|---|---|---|
| 4,550,062 | 10/1985 | Takayama et al. | 428/611 |
| 4,594,296 | 6/1986 | Noguchi et al. | 428/610 |
| 4,652,460 | 3/1987 | Shirahata et al. | 427/39 |
| 5,225,234 | 7/1993 | Takai et al. | 428/336 |
| 5,244,751 | 9/1993 | Takayama et al. | 428/694 T |

FOREIGN PATENT DOCUMENTS

| | | |
|---|---|---|
| 0443478 | 8/1991 | European Pat. Off. |
| 0456227 | 11/1991 | European Pat. Off. |
| 59-124035 | 7/1984 | Japan |
| 59-185024 | 10/1984 | Japan |
| 60-201521 | 10/1985 | Japan |
| 4-67433 | 3/1992 | Japan |

OTHER PUBLICATIONS

Chiba et al., IEEE Transactions on Consumer Electronics, 35(3), 421–427 (1989).
Feuerstein et al., Metal Finishing, 83(9), 47–52 (1985).
National Technical Report, 25(5) 1058–1069 (1979).

*Primary Examiner*—Paul Thibodeau
*Assistant Examiner*—Stephen Sand
*Attorney, Agent, or Firm*—Wenderoth, Lind & Ponack

[57] ABSTRACT

A magnetic tape having a polymer substrate and a magnetic layer which is formed directly on a surface of the substrate or on a primer layer formed on the substrate and contains cobalt, oxygen and optionally nickel, in which a coercive force is at least 120 kA/m and a squareness ratio is at least 0.9 in a hysteresis loop which is obtained when a magnetic field is applied in a plane of the magnetic layer in a longitudinal direction of the magnetic tape, and on the hysteresis loop, an intensity of the applied magnetic field, at which a magnetization when the applied magnetic field is increased is 99% of the magnetization when the applied magnetic field is decreased, is not larger than 400 kA/m, and preferably, a ratio of a value of magnetization at an intersection between a tangential line drawn at a point which gives a residual magnetization at the applied magnetic field of 0 (zero) and a tangential line drawn at a point which gives a coercive force with a magnetization of 0 in a second quadrant to said residual magnetization is at least 0.9, which magnetic tape has improved high density recording/reproducing properties.

6 Claims, 22 Drawing Sheets

MAGNETIC RECORDING MEDIUM AND METHOD FOR PRODUCING THE SAME

BACKGROUND OF THE INVENTION

1. Field of the Invention

The present invention relates to a magnetic recording medium which is excellent in high density recording/reproducing characteristics and a method for producing the same.

2. Description of the Related Art

These days, the recording density of a magnetic recording/reproducing equipment has been increased, while its size has been reduced. As one of the magnetic recording media which can exceed the limit of recording density performance of a conventional coating type magnetic recording medium, a thin film magnetic recording medium attracts attention. A thin film type magnetic recording medium having a magnetic layer comprising Co, Ni and O is commercially produced and sold as a magnetic tape for VCR (Video Cassette Receiver). To produce the thin film magnetic recording medium with good productivity, for example, a magnetic layer is continuously vapor deposited on a tape-shaped polymer substrate which is transferred along a circumference of a cylindrical can in a vapor deposition apparatus. In such method, when the magnetic layer is obliquely deposited, the high density recording/reproducing characteristics are improved because of the contribution of a magnetization component in a direction vertical to a plane of the magnetic layer, in comparison with the conventional coating type magnetic recording media.

The thin film magnetic recording media produced by the above method have contributed greatly to the popularization of a home-use camcorder type VCR, and are expected to be used in a next generation home-use compact digital VCR, in particular, a digital VCR which is compatible to high definition TV.

One of the important factors in realizing a home-use compact digital VCR which makes long time recording possible is that a cassette tape should be made small while its recording capacity should be increased. That is, while the cassette tape is required to be miniaturized for conveniently carrying and using it, it is required to have a large recording capacity which can record a large amount of digital signals which accommodate a long time recording. To satisfy both requirements, it is essential to increase the recording density of the signals on the magnetic tape. However, the currently used thin film magnetic tapes do not necessarily have the high density recording performance which satisfies the above requirements.

The current home-use VCR uses a tape traveling system comprising a rotating cylinder which carries a magnetic head. As one of the measures for further miniaturizing the magnetic recording apparatus with such system, it is contemplated that, by the introduction of an overwriting system, an erasing head is eliminated to reduce the size of the rotating cylinder. To introduce the overwriting system, the magnetic tape should have excellent overwriting properties, which depend also on the properties of the recording head. However, the current thin metal magnetic tape does not have the overwriting properties which can accommodate with the introduction of the overwriting system, when it is used in combination with a generally used ring-type magnetic head having a saturation magnetic flux density of about 1 T or less and a gap length of about 0.2 to 0.3 µm. In particular, when a high frequency signal having a wavelength of 1 µm or less is overwritten on a pilot signal having a wavelength of 10 µm or longer which is used for tracking, a residual level of the pilot signal is very high, and such high residual level of the signal prevents the practical use of the magnetic tape in the overwriting system.

In view of the above drawbacks of the currently used thin film magnetic tapes, it is highly desired to provide a high quality magnetic tape having a higher recording density performance and better overwriting properties to realize a home-use compact digital VCR.

SUMMARY OF THE INVENTION

An object of the present invention is to provide a magnetic tape having improved overwriting properties and a higher recording density performance.

According to the present invention, there is provided a magnetic tape comprising a polymer substrate and a magnetic layer which is formed directly on a surface of said substrate or on a primer layer (under layer) formed on said substrate and comprises cobalt, oxygen and optionally nickel, wherein a coercive force is at least 120 kA/m and a squareness ratio is at least 0.9 in a hysteresis loop which is obtained when a magnetic field is applied in a plane of said magnetic layer in a longitudinal direction of the magnetic tape, and on the hysteresis loop, an intensity of the applied magnetic field, at which a magnetization when the applied magnetic field is increased is 99% of the magnetization when the applied magnetic field is decreased, is not larger than 400 kA/m.

Preferably, the magnetic tape of the present invention comprises a polymer substrate, a nonmagnetic primer layer which comprises CoO, and a magnetic layer which is formed on said primer layer and comprises cobalt, oxygen and optionally nickel, wherein a coercive force is at least 120 kA/m in a hysteresis loop which is obtained when a magnetic field is applied in a plane of said magnetic layer in a longitudinal direction of the magnetic tape, and, on the hysteresis loop, a ratio of a value of magnetization at an intersection between a tangential line drawn at a point which gives a residual magnetization at the applied magnetic field of 0 (zero) and a tangential line drawn at a point which gives a coercive force with a magnetization of 0 in a second quadrant to said residual magnetization is at least 0.9.

DETAILED DESCRIPTION OF THE INVENTION

Hitherto, as properties which relate to the recording/reproducing properties of the magnetic recording medium, residual magnetization Mr, a squareness ratio S which is a ratio of the residual magnetization Mr to the saturation magnetization Ms, a coercive force Hc, and a thickness δ of the magnetic layer are considered to be important. That is, to increase the reproducing output, the residual magnetization Mr and the squareness ratio S should be increased. To attain the higher recording density by improving the medium recording density performance, the coercive force Hc should be increased in accordance with Mr and S, and the thickness of the magnetic layer should be decreased. But, since the coercive force Hc is limited by the intensity of magnetic field generated by the recording head, if it is increased excessively with neglecting the ability of the recording head, the overwriting properties are deteriorated and the high recording density characteristics is also deteriorated.

According to the present invention, to achieve both higher recording density performance and the overwriting properties of the thin film magnetic tape having the magnetic layer comprising cobalt, oxygen and optionally nickel, two novel factors required for the magnetic layer have been found and realized.

First, the control of the Hs which is the factor for improving the overwriting properties will be explained.

The Hs is intended to mean an intensity of the applied magnetic field at which a magnetization when the applied magnetic field is increased is 99% of the magnetization when the applied magnetic field is decreased; that is, an intensity of the applied magnetic field at which the hysteresis curve, when the applied magnetic field is increased and when the applied magnetic field is decreased, coincide substantially, so the value of magnetization of the magnetic medium against the intensity of the applied magnetic field is substantially uniformly defined.

Figure 1:
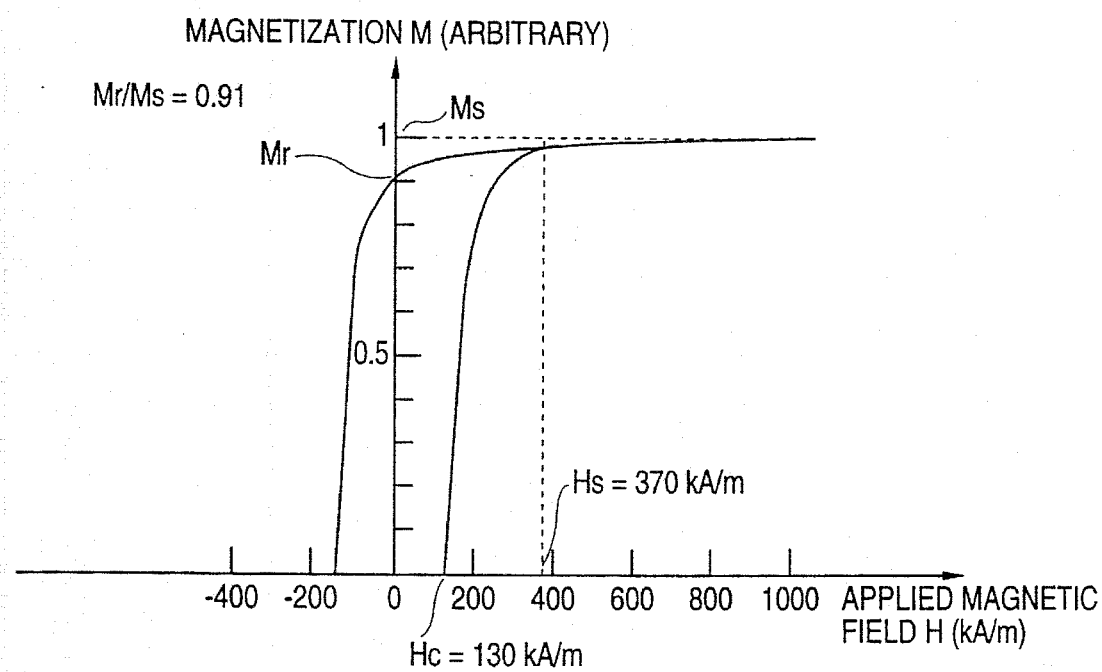
FIG. 1 shows an example of a hysteresis loop of the magnetic tape according to the present invention.

FIG. 1 shows an example of the hysteresis loop obtained by applying the magnetic field on the magnetic tape of the present invention in the plane of magnetic layer in the longitudinal direction of the tape.

Figure 3:
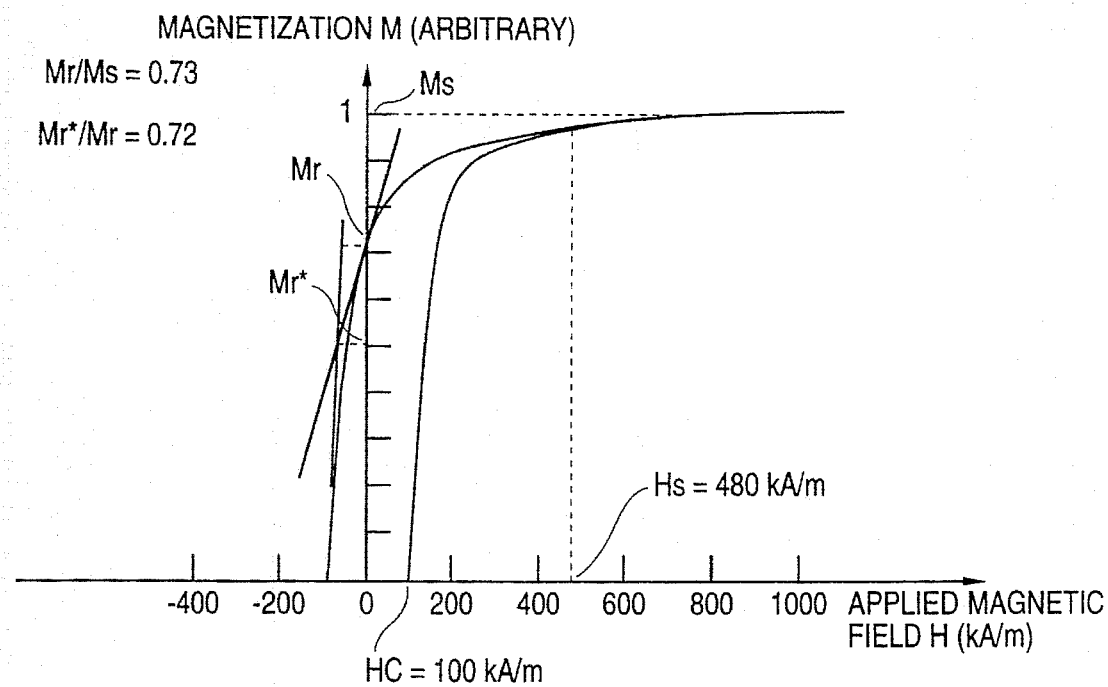
FIG. 3 shows an example of a hysteresis loop of the conventional magnetic tape.

In this hysteresis loop, the coercive force Hc is 130 kA/m, which is larger than a coercive force of a conventional thin film magnetic tape having a magnetic layer comprising Co, Ni and O, while Hs is not larger than 400 kA/m and smaller than that of the conventional thin film magnetic tape. The Hs of the conventional thin film magnetic tape is comparatively large and about 480 kA/m according to the measurement by the present inventors, the hysteresis loop of which is shown in FIG. 3. In addition, an initial slope of the hysteresis curve when the applied magnetic field is increased is smaller than that in FIG. 1 of the magnetic tape according to the present invention. Accordingly, in the conventional magnetic tape, while the coercive force Hc is 100 kA/m which is smaller than the magnetic tape according to the present invention, the recording ability of the magnetic head is insufficient, so that the satisfactory overwriting properties are not achieved.

In contrast, with the magnetic tape according to the present invention, the initial slope of the hysteresis curve when the applied magnetic field is increased is sufficiently steep, since the Hs is small. When the same recording head is used in combination with the conventional thin film magnetic tape and the magnetic tape according to the present invention, the latter has a better recording efficiency than the former. Because of the high recording efficiency, the magnetic tape according to the present invention has better overwriting properties than the conventional thin film magnetic tape having the magnetic layer containing Co, Ni and O, in spite of the large coercive force of 130 kA/m.

As seen from FIG. 1, the magnetic tape according to the present invention has the squareness ratio of at least 0.9, which is better than that of the conventional thin film magnetic tape of FIG. 3. As already explained, the coercive force Hc should be increased in accordance with the squareness ratio to improve the recording density of the magnetic tape. From this view point, the magnetic tape according to the present invention should have the coercive force of at least 120 kA/m to achieve the good recording/reproducing properties. When the coercive force is less than 120 kA/m, the reproducing output in the high recording density range decreases, and the noise of the medium increases so that a C/N ratio significantly decreases.

The coercive force Hc is limited by the intensity of magnetic field generated by the recording head. With the conventional thin film magnetic tape, when the coercive force is increased up to 120 kA/m, the recording ability of the head comes short. Since the magnetic tape according to the present invention has the Hs of not larger than 400 kA/m, if the coercive force is increased up to about 200 kA/m, the sufficiently good overwriting properties are achieved even with the recording ability of the ring-type magnetic head having the gap length of about 0.2 to 0.3 μm which is conventionally used in commercially marketed VCR.

The above factor Hs of not larger than 400 kA/m may be achieved by less dispersion of an axis of easy magnetization in the thickness direction of the magnetic layer than the conventional thin film magnetic tape.

FIG. 4 shows an example of a cross sectional structure of the magnetic tape according to the present invention in its longitudinal direction.

FIG. 7 shows a cross sectional structure of the commercially available thin film magnetic tape having a magnetic layer containing Co, Ni and O, in its longitudinal direction.

Figure 4A:
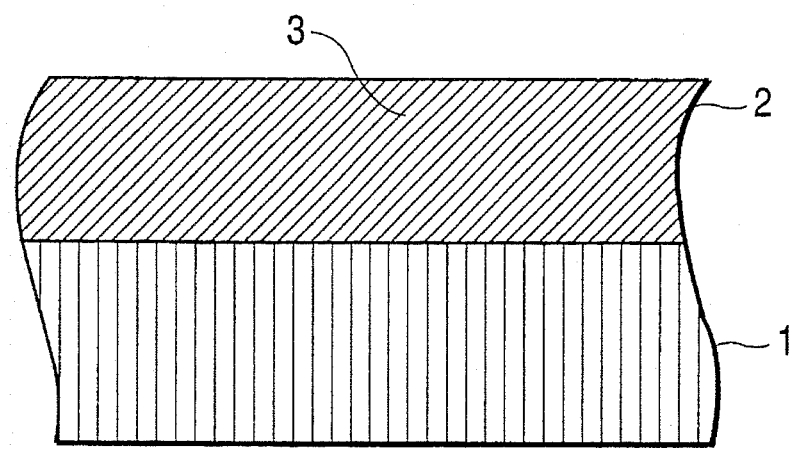
FIGS. 4A and 4B show examples of cross sectional structures of the magnetic tapes according to the present invention.
Figure 4B:
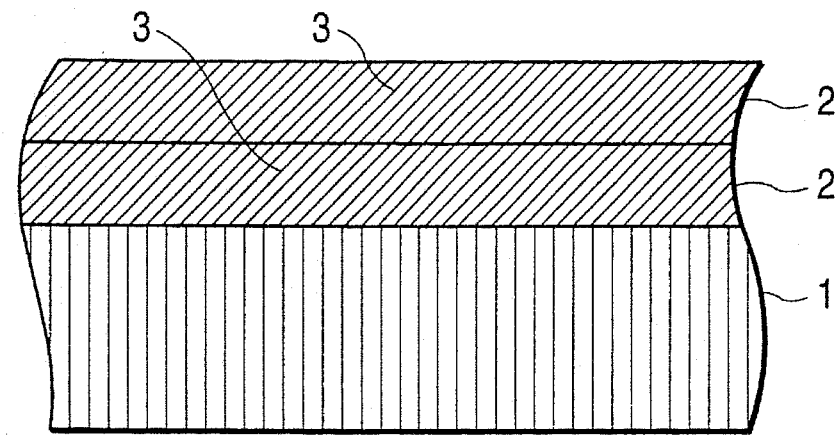
Figure 7A:
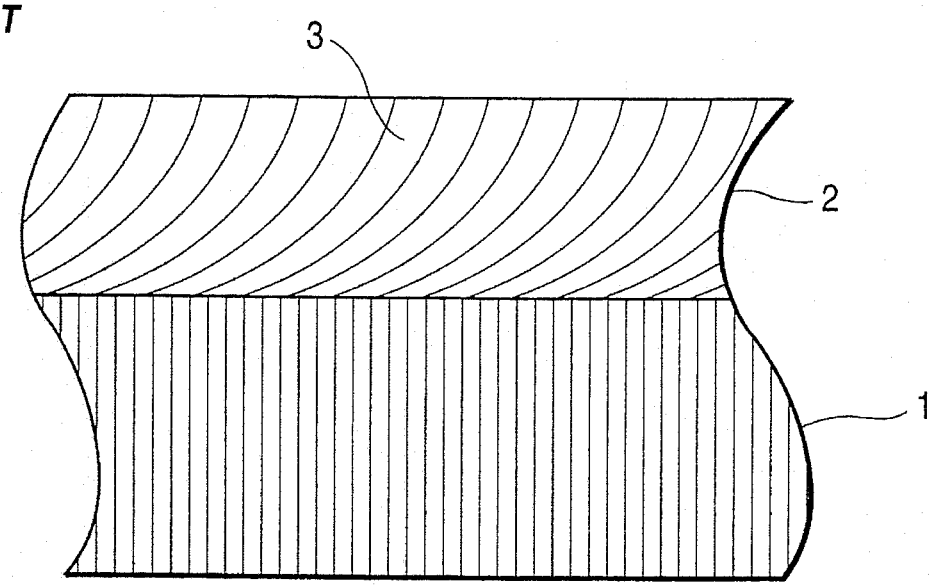
FIGS. 7A and 7B show cross sectional structures of the conventional magnetic tapes, FIG. 8 schematically shows an embodiment of a vacuum deposition apparatus for producing a magnetic tape.
Figure 7B:
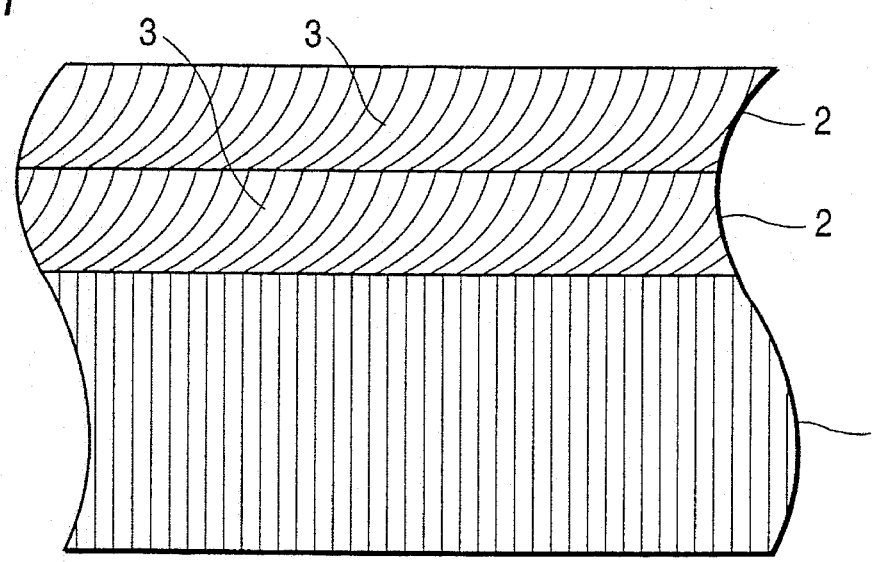

In each of FIGS. 4 and 7, the magnetic tape comprises a polymer substrate 1 and a magnetic layer comprising Co, O and optionally Ni. The magnetic layer 2 may be a single layer as shown in FIGS. 4A and 7A, while it preferably has a double layer structure as shown in FIGS. 4B and 7B, since the coercive force Hc is slightly increased, and the medium noise is decreased. This may be because a very thin oxide layer may be formed between the first and second magnetic layers, so that the two magnetic layers are magnetically separated.

The cross sectional structures of the magnetic layer such as shown in FIGS. 4 and 7 are clearly observed with a scanning or transmission electron microscope. According to the observation, the magnetic particles in the magnetic layer 2 form agglomerates, and grow in the columnar form in a direction slanting from the normal direction to the plane of the polymer substrate 1. In the magnetic layer 2, the direction of axis of easy magnetization may be in substantially the same direction as the growth direction because of a shape magnetic anisotropy and a crystal magnetic anisotropy of the columnar crystal grains 3.

The typical difference between the magnetic tape according to the present invention and the conventional thin film magnetic tape is that the columnar crystal grains 3 of the conventional magnetic tape grow in a warped state as shown in FIG. 7, while those of the magnetic tape of the present invention grow substantially straightly. This suggests that, in the conventional magnetic tape, the direction of axis of easy magnetization changes depending on the slanting direction of the columnar crystal grains 3 in the thickness direction of the magnetic layer 2. Accordingly, with the conventional magnetic tape shown in FIG. 7, the dispersion of the magnetic anisotropy is very large in the thickness direction of the magnetic layer 2.

In contrast, with the magnetic tape according to the present invention shown in FIG. 4, the directions of axes of easy magnetization are uniform in the thickness direction of the magnetic layer 2, so that the dispersion of magnetic anisotropy is small.

The above difference may lead to the difference of the hysteresis loops shown in FIGS. 1 and 3.

Figure 8:
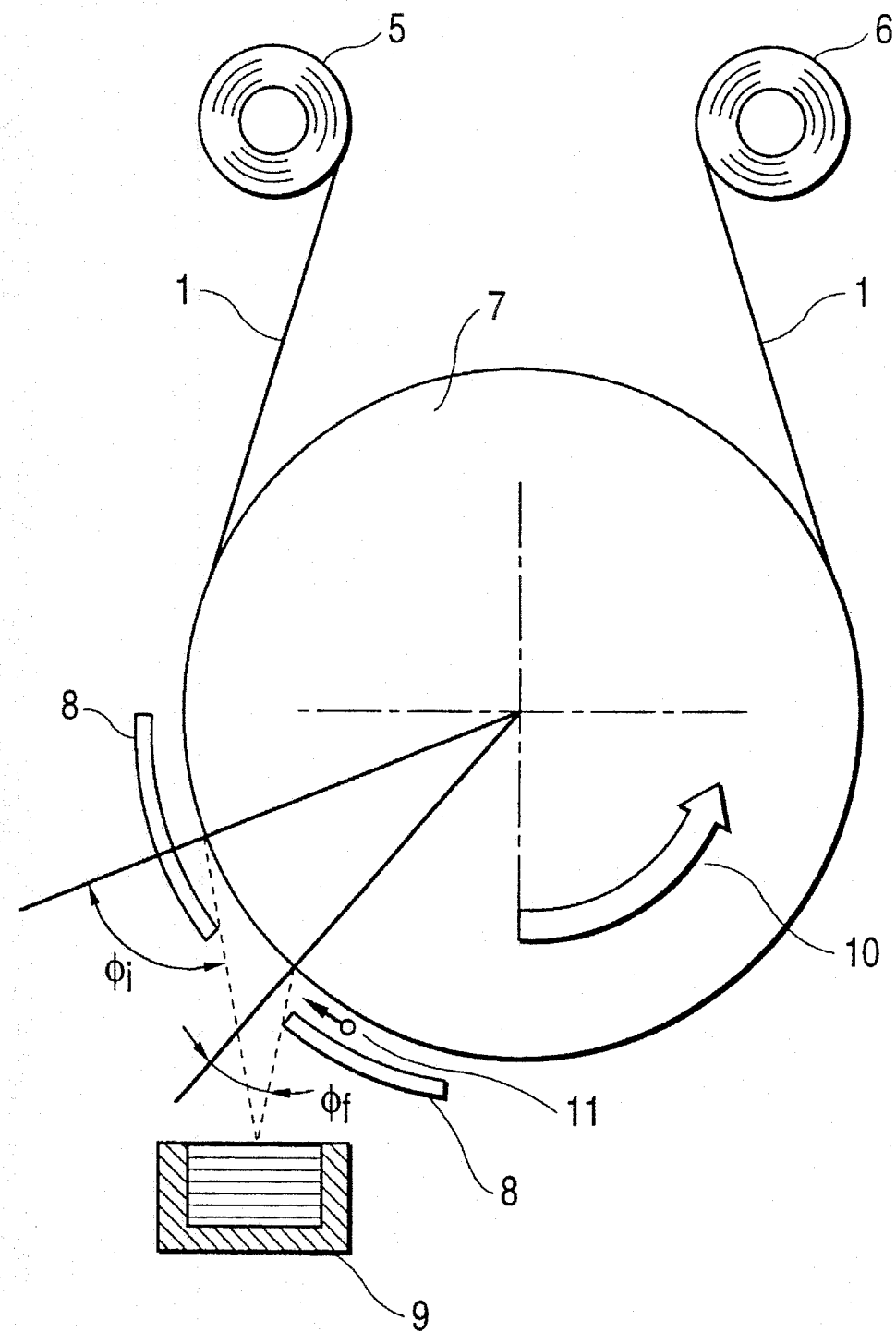

An example of a method for producing the thin film magnetic tape according to the present invention is explained by making reference to FIG. 8, which shows an embodiment of a vacuum deposition apparatus used for forming a magnetic layer of the thin film magnetic tape.

To form the magnetic layer, the tape-shaped polymer substrate 1 is unwound from the supply roll 5, traveled around the peripheral surface of the cylindrical can 2 in the direction of the arrow 10, and wound on a take-up roll 6. Between the evaporation source 9 and the cylindrical can 7, the shielding plate 8 is provided. Through an opening in the shielding plate, the metal vapor is deposited on the surface of substrate 1.

An incident angle of the metal vapor on the polymer substrate 1 changes from an initial incident angle $\phi_i$ to a final incident angle $\phi_f$ continuously. As the result, the formed layer consists of columnar crystal grains 3 which warp. As the incident angle range is larger, the degree of warping is larger. As the degree of warping of the columnar crystal grains 3 increases, the directions of the axes of easy magnetization differ greatly between the initial part of the film formation and the final part of the film formation, so that the dispersion of the magnetic anisotropy in the whole magnetic layer becomes large. The magnetic layer of the conventional thin film magnetic tape shown in FIG. 7 is formed in a wide rang of incident angle from a high incident angle $\phi_i$ of 90° to a low incident angle $\phi_f$ of around 40°. Therefore, the columnar crystal grains warp. When the magnetic layer is formed using the vacuum deposition apparatus of FIG. 8, it is essential to form the magnetic layer by depositing the metal vapor in a narrow incident angle range with removing the high incident angle range near 90° and the low incident angle range close to the vertical incident to the normal line to the substrate plane. The incident angle conditions in which the formed magnetic layer has the coercive force Hc of at least 1200 kA/m, the squareness ratio of at least 0.9 and the Hs of not larger than 400 kA/m include the initial incident angle $\phi_i$ of 70° to 85° and the final incident angle $\phi_f$ of 55° to 75°. In principle, the narrower incident angle range from the initial incident angle $\phi_i$ to the final incident angle $\phi_f$ is better. Practically, since the stream of metal vapor is disturbed to some extent, the incident angle of the metal vapor may not be controlled by the shielding plate 8 in certain cases. Therefore, the incident angle range should be suitably adjusted depending on the size of the apparatus, a relative position of the evaporation source 9 and the cylindrical can 7, and a distance between the shielding plate 8 and the cylindrical can 7.

In order to further increase the recording/reproducing properties in the high recording density range, it is necessary to make full use of the magnetic energy of the magnetic material which forms the magnetic layer. To this end, the dispersion of magnetic anisotropy is suppressed further, and the magnetic anisotropic energy of the whole magnetic layer should be increased. For achieving this, the second factor, namely a Mr*/Mr ratio is taken into consideration. The Mr*/Mr ratio will be explained.

The Mr*/Mr ratio is a ratio of a value of magnetization Mr* at an intersection between a tangential line drawn at a point which gives a residual magnetization Mr at the applied magnetic field of 0 (zero) on the hysteresis loop and a tangential line drawn at a point which gives a coercive force −Hc with a magnetization of 0 in a second quadrant to the residual magnetization Mr.

Figure 2:
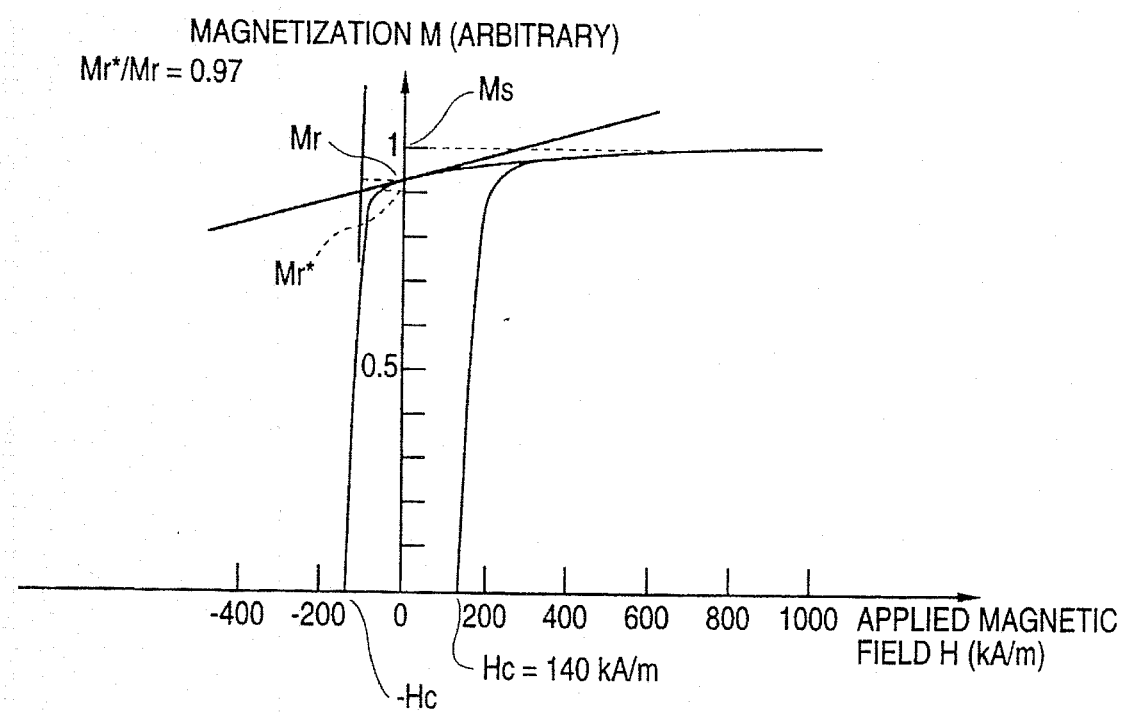
FIG. 2 shows another example of a hysteresis loop of the magnetic tape according to the present invention.
Figure 5A:
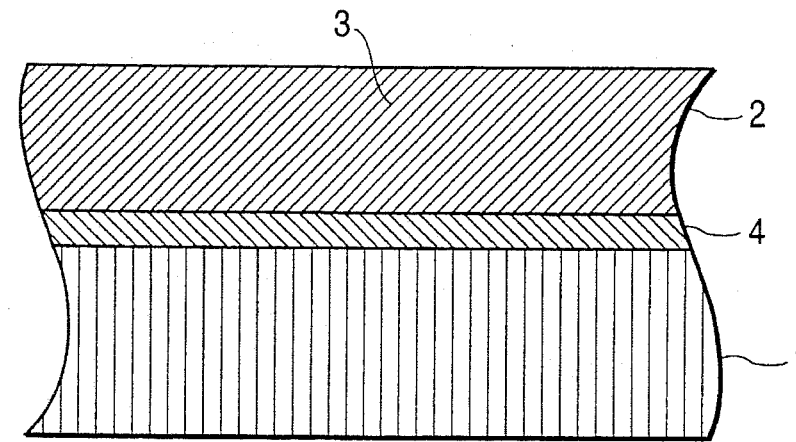
FIGS. 5A and 5B show other examples of cross sectional structures of the magnetic tapes according to the present invention.
Figure 5B:
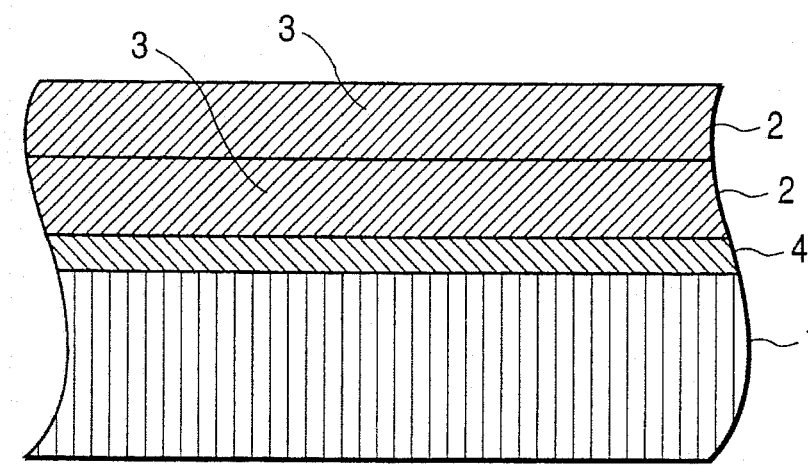

FIG. 2 shows another example of the hysteresis loop which is obtained when the magnetic field is applied on the magnetic layer in its plane in the longitudinal direction. This magnetic tape has the cross sectional structure shown in FIG. 5 in its longitudinal direction. That is, the magnetic tape of FIG. 5 comprises the polymer substrate 1, the nonmagnetic primer layer 5 comprising CoO, and the magnetic layer 2 comprising Co, O and optionally Ni. As in FIG. 4, the magnetic layer may be a single layer as shown in FIG. 5A, while it has preferably a double layer structure as shown in FIG. 5B to decrease the medium noise. In the hysteresis loop of FIG. 2, the Mr*/Mr ratio is at least 0.9, which is larger than that of the conventional thin film magnetic tape of FIG. 7 or the magnetic tape of FIG. 4. The Mr*/Mr ratio represents a degree of dispersion of magnetic anisotropy of the magnetic grains which are contained in the magnetic layer. When the directions of the axes of easy magnetization and the intensities of the anisotropic energy are both as uniform as possible, the Mr*/Mr ratio is close to 1 (one). When the directions of the axes of easy magnetization are uniform but the intensities of the anisotropy energy are not, the Mr*/Mr ratio is small. In the hysteresis loop of FIG. 1 for the magnetic tape having the structure of FIG. 4, the Mr*/Mr ratio is 0.87. In the hysteresis loop of FIG. 3 for the conventional thin film magnetic tape of FIG. 3, the Mr*/Mr ratio is less than 0.8. These ratios mean that the magnetic tape of FIG. 4, and the conventional thin film magnetic tape have the larger dispersion of the magnetic anisotropy than the magnetic tape having the structure of FIG. 5.

The magnetic tapes having the structures of FIGS. 4 and 5 according to the present invention and the conventional thin film magnetic tape having the structure of FIG. 7 were analyzed by the torque measurement according to the measuring method described by Makoto Noda, "Measurement of Anisotropy in Obliquely Oriented Media": IEEE Trans. on Magn., Vol. 27, No. 6, pages 4864–4866, November 1991, the disclosure of which is hereby incorporated by reference.

As a result, the uniaxial anisotropy constant, which indicates the intensity of magnetic anisotropy, was less than 0.15 $J/cm^3$ in the conventional thin film magnetic tape having the structure of FIG. 7, while it was 0.20 $J/cm^3$ or larger in the magnetic tape having the structure of FIG. 4 according to the present invention. Further, when the primer layer of CoO was provided as shown in FIG. 5 and the Mr*/Mr ratio was made at least 0.9, the uniaxial anisotropy constant was increased to 0.23 $J/cm^3$ or larger. With the magnetic tape having the large Mr*/Mr ratio of 0.97, which can be produced by the method in which the below described conditions are employed, the Mr*/Mr ratio can exceed 0.30 $J/cm^3$, which is two times larger than that of the conventional thin film magnetic tape.

Since the dispersion of magnetic anisotropy in the magnetic tape which presents the hysteresis loop of FIG. 2 is suppressed as much as possible, the magnetic tape makes full use of the magnetic energy of the magnetic material contained in the magnetic layer. As the high magnetic anisotropic energy is achieved, the magnetic tape according to the present invention is more excellent in the reproducing output in the high recording density range and the C/N characteristics than the conventional thin film magnetic recording medium.

To produce the magnetic tape which presents the hysteresis loop of FIG. 2 according to the present invention, attention should be paid on the column shape of the crystal grains, and also crystallinity of the magnetic layer and distribution of oxygen atoms in the magnetic layer.

The crystallinity of the magnetic layer will be explained. The main reason why cobalt is selected as the main magnetic component in the magnetic layer is that cobalt has a large crystal magnetic anisotropy. By the increase of crystallinity of the whole magnetic layer, the magnetic anisotropy of the magnetic layer can be increased. The crystallinity of the whole magnetic layer depends on the crystalline state in the initial stage of the formation of magnetic layer and is influenced by the substrate temperature in the step of forming the magnetic layer. In the case of the structure of FIG. 5, to improve the crystalline condition in the initial stage, the nonmagnetic CoO layer 4 is provided as the primer layer.

The primer layer can be formed using the apparatus of FIG. 8 by evaporating the cobalt metal and depositing the cobalt vapor on the substrate with supplying an excessive amount of oxygen near a part of the substrate on which the cobalt vapor is deposited. The deposited nonmagnetic CoO layer 4 comprises columnar crystal grains which have grown substantially vertically to the substrate surface irrespective of the incident angle since the cobalt vapor is diffused by the excessive oxygen gas. When the nonmagnetic CoO primer layer is formed, the substrate temperature is not limited. The substrate temperature is selected by taking the generation of oligomers from the polymer substrate or the heat resistance of the polymer substrate into account.

Figure 9:
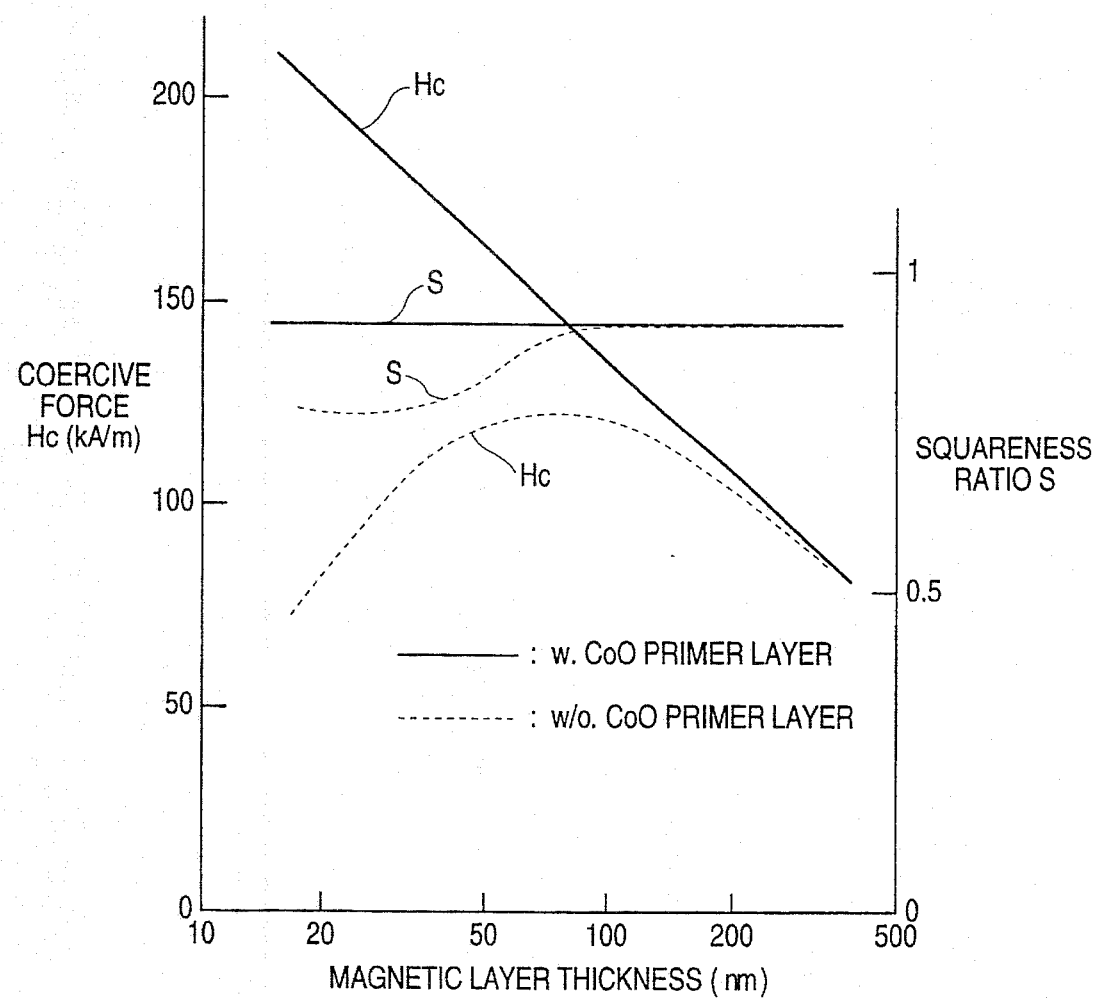
FIG. 9 is a graph showing the dependencies of the coercive force and the squareness ratio on the thickness of the magnetic layer.

FIG. 9 shows the dependency of the coercive force Hc and the squareness ratio S of the magnetic layer on the magnetic layer thickness, when the magnetic layer comprising Co and O is formed on the substrate with or without the nonmagnetic CoO primer layer 4. The results show that the presence of the nonmagnetic CoO primer layer improves the crystalline condition in the initial stage of the magnetic layer formation and increases the magnetic anisotropy of the whole magnetic layer. The effect of the nonmagnetic CoO primer layer is remarkable when the thickness of the magnetic layer formed on the nonmagnetic CoO primer layer is small. When the nonmagnetic CoO primer layer is not formed, the thinner magnetic layer is more influenced by the dispersion of the magnetic anisotropy in the initial stage of the magnetic layer formation, so that the coercive force Hc and the squareness ratio S are decreased. When the magnetic layer is thick, preferential growth of the magnetic grains is found, and the ratio of the preferentially grown part in the layer thickness increases as the layer thickness increases, so that the magnetic anisotropy of the whole magnetic layer is intensified.

Whether the nonmagnetic CoO primer layer 4 is present or absent, in the range where the film thickness is large, the coercive force Hc is decreased, which may be caused by the increase of the crystal grain size. To achieve the coercive force Hc of at least 120 kA/m which corresponds to the squareness ratio of 0.9, the thickness of the magnetic layer is preferably 150 nm or less.

Figure 10:
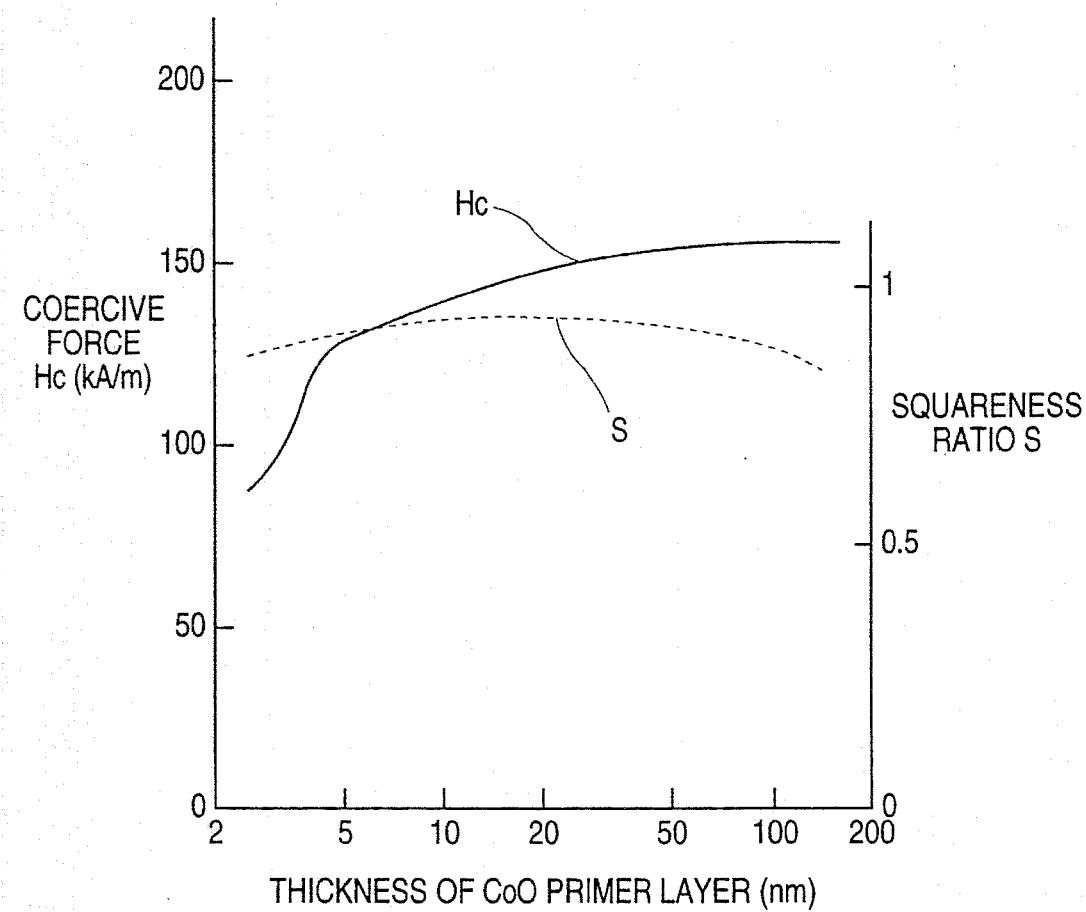
FIG. 10 is a graph showing the dependencies of the coercive force and the squareness ratio on the thickness of the nonmagnetic CoO primer layer.

FIG. 10 shows a dependency of the coercive force Hc and the squareness ratio S of the magnetic layer comprising Co and O on the thickness of the nonmagnetic CoO primer layer. The coercive force Hc decreases at the primer thickness of about 5 nm or less. Above the thickness of about 5 nm, the coercive force gradually increases as the primer thickness increases. The squareness ratio is not greatly influenced by the primer thickness. To obtain the effect of the nonmagnetic CoO primer layer, its thickness is adjusted at about 5 nm or larger.

Figure 11:
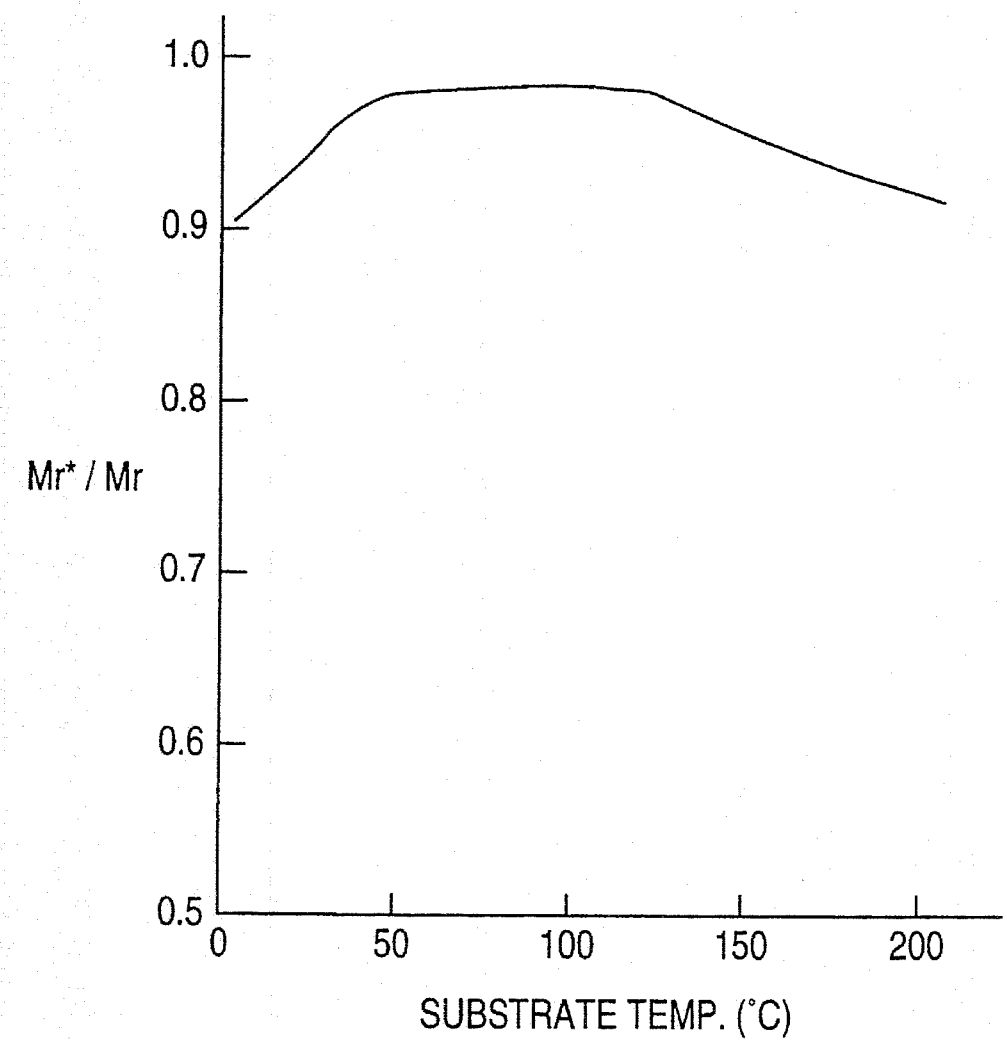
FIG. 11 is a graph showing the dependency of the Mr*/Mr ratio on the substrate temperature during the formation of the magnetic layer.

The substrate temperature during the formation of the magnetic layer has great influence on the crystallinity of the magnetic layer. FIG. 11 shows a relationship between the substrate temperature during the formation of the magnetic layer and the Mr*/Mr ratio. The Mr*/Mr ratio quickly increases as the substrate temperature increases. In the temperature range between about 50° C. and about 120° C., the Mr*/Mr ratio is substantially constant, and above about 120° C., it gradually decreases. As explained below, the C/N ratio of the magnetic tape in the high recording density range greatly depends on the Mr*/Mr ratio. It is important to maintain the high Mr*/Mr ratio stably for the purpose of the production of high quality magnetic recording medium. Accordingly, the substrate temperature of 50° to 120° C. is one of the important conditions. The mechanism of the dependency of the Mr*/Mr ratio on the temperature has not been clarified, but may be that a degree of migration of the atoms which reach the substrate changes according to the substrate temperature. That is, at the substrate temperature lower than 50° C., the atoms easily move as the temperature increases, and the crystallinity is improved so that the Mr*/Mr ratio increases. When the substrate temperature exceeds 120° C., the crystal growth due to the migration is predominant, and the crystal growth due to the incident angle of the atom vapor is more or less suppressed, so that the magnetic anisotropy decreases and the Mr*/Mr ratio decreases.

Figure 12:
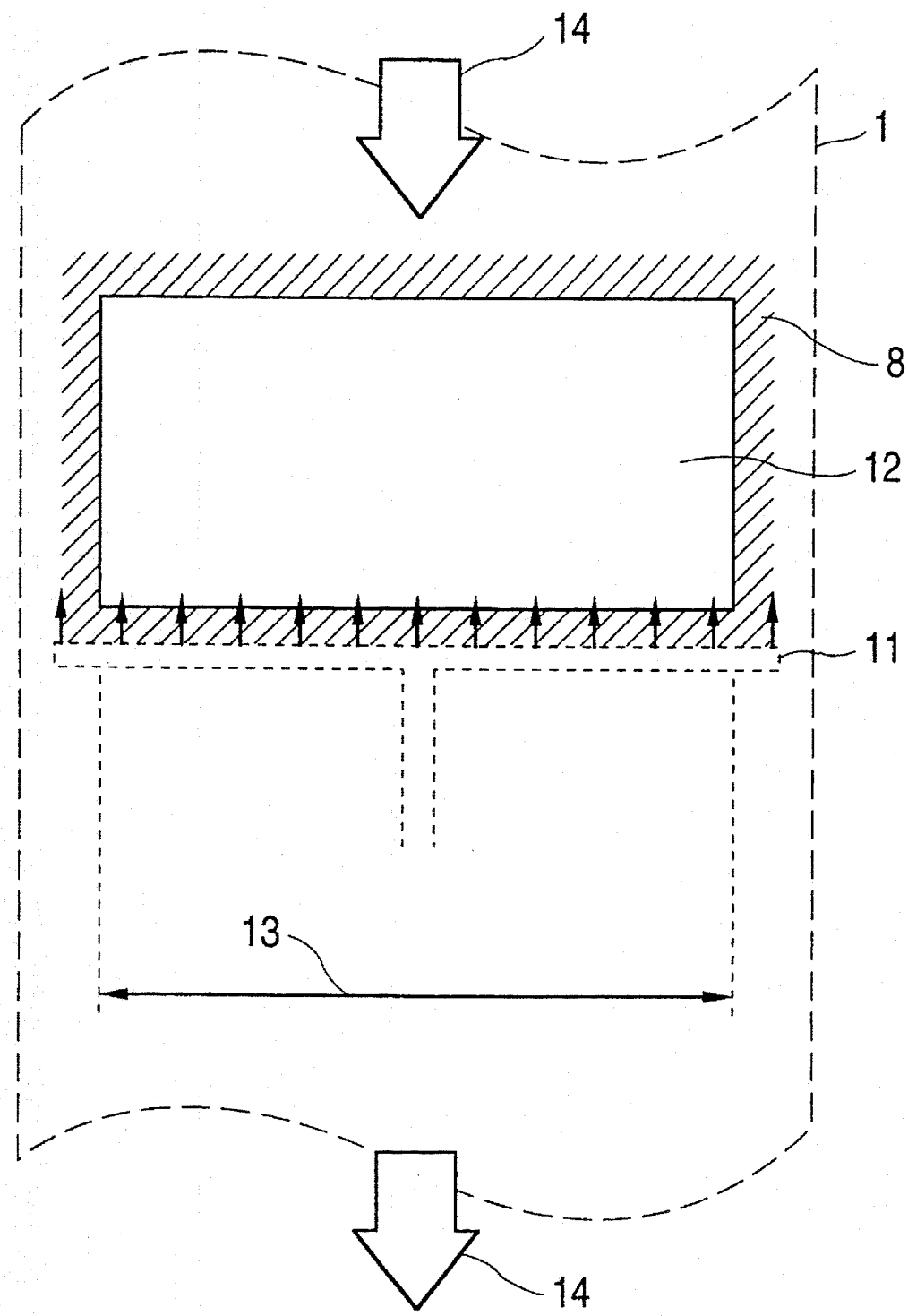
FIG. 12 shows positioning of the polymer substrate, the shielding plate and the oxygen-supplying nozzle in the conventional method for producing the magnetic tape.

Now the oxygen distribution profile in the magnetic layer will be explained. When the magnetic layer comprising Co, O and optionally Ni is formed by depositing the Co vapor or Co/Ni vapor on the substrate 1 by the apparatus of FIG. 8, the oxygen gas is introduced towards the deposition finishing point from the oxygen supplying nozzle 11 which is provided between the shielding plate 8 and the cylindrical can 7. FIG. 12 shows the relative positions of the polymer substrate 1, the opening 12 of the shielding plate 8 and the oxygen supplying nozzle 11 in the conventional method. While the polymer substrate 1 moves in the direction of the arrow 14, it passes the opening 12 of the shielding plate 8, and the magnetic film is formed on the polymer substrate 1 in a width 13. The oxygen gas is supplied towards the deposition finishing point from the nozzle 11. When the composition profile of Co and O in the thickness direction is measured with the magnetic layer formed by the structure of FIG. 12, it is found that the oxygen content in a part corresponding to the deposition initiating point is larger than other parts of the magnetic layer. In particular, in the part in which the incident angle of the atom vapor is 90° or slightly less than 90° from the normal line to the substrate plane, the ratio of Co to O is substantially 1 (one). This means that the part of the magnetic layer formed at the incident angle $\phi_i$ of about 90° is nonmagnetic. There are two causes for this. One of the causes is that since, in the high incident angle range, the deposition efficiency of the atom vapor is low and the distance from the evaporation source is large, the density of the atom vapor is low, resulting in the relatively high content of oxygen in the layer. The other cause is that, a part of the supplied oxygen gas is excessive and the excessive oxygen gas reaches the deposition initiating point via the outside edge of the magnetic layer-forming width 13. When the incident angle range of the atom vapor is widened, the supplied amount of the oxygen gas should be increased relatively, and therefore the uncontrollable excessive amount of the oxygen gas increases. Accordingly, in view of the oxygen distribution in the magnetic layer, it is necessary to reduce the incident angle range by removing the high incident angle range near 90° and the low incident angle range. However, the narrowing of the incident angle range is not preferable in view of the productivity of the magnetic tape.

Figure 13:
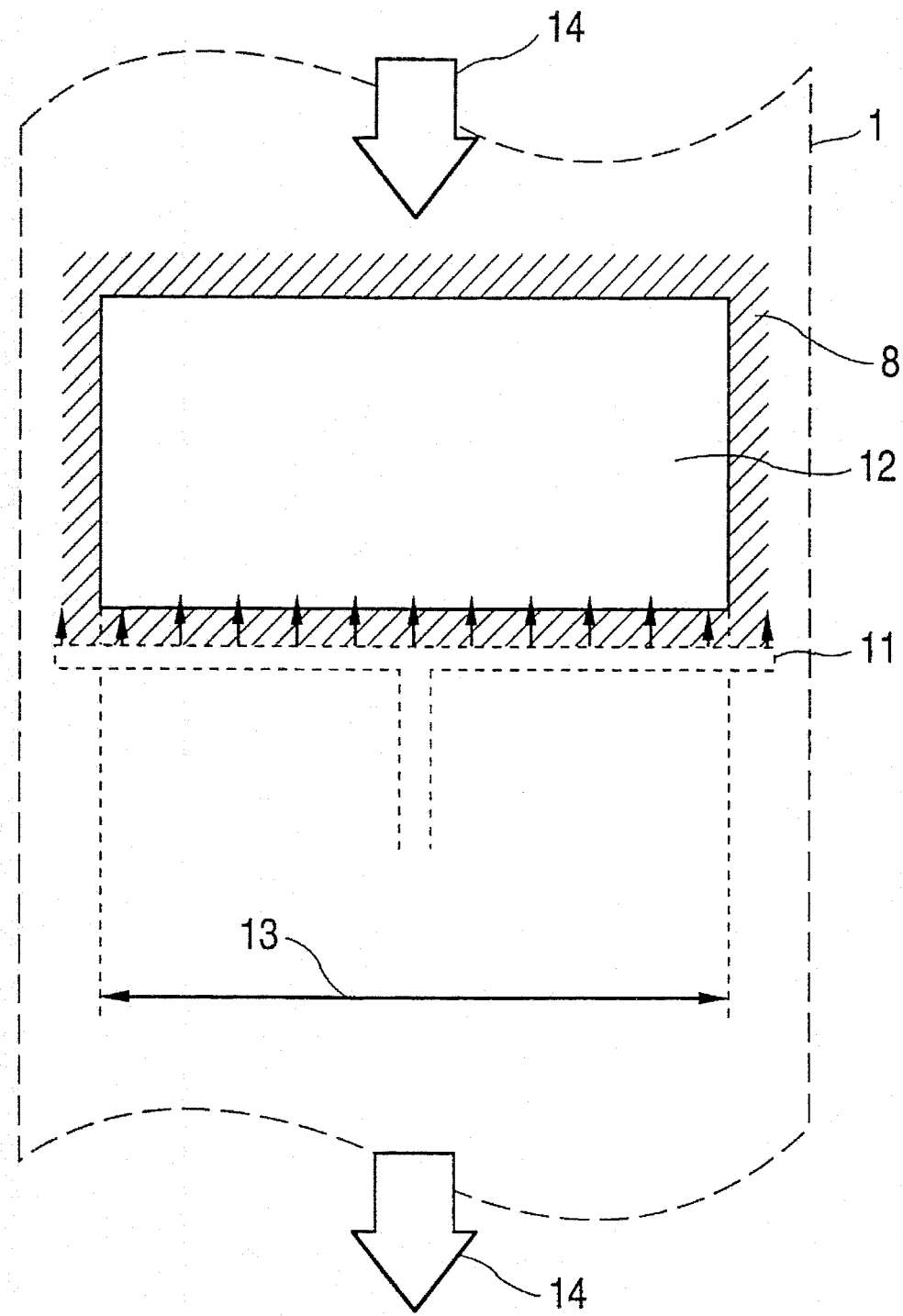
FIG. 13 shows an example of positioning of the polymer substrate, the shielding plate and the oxygen-supplying nozzle in the method for producing the magnetic tape according to the present invention.
Figure 14:
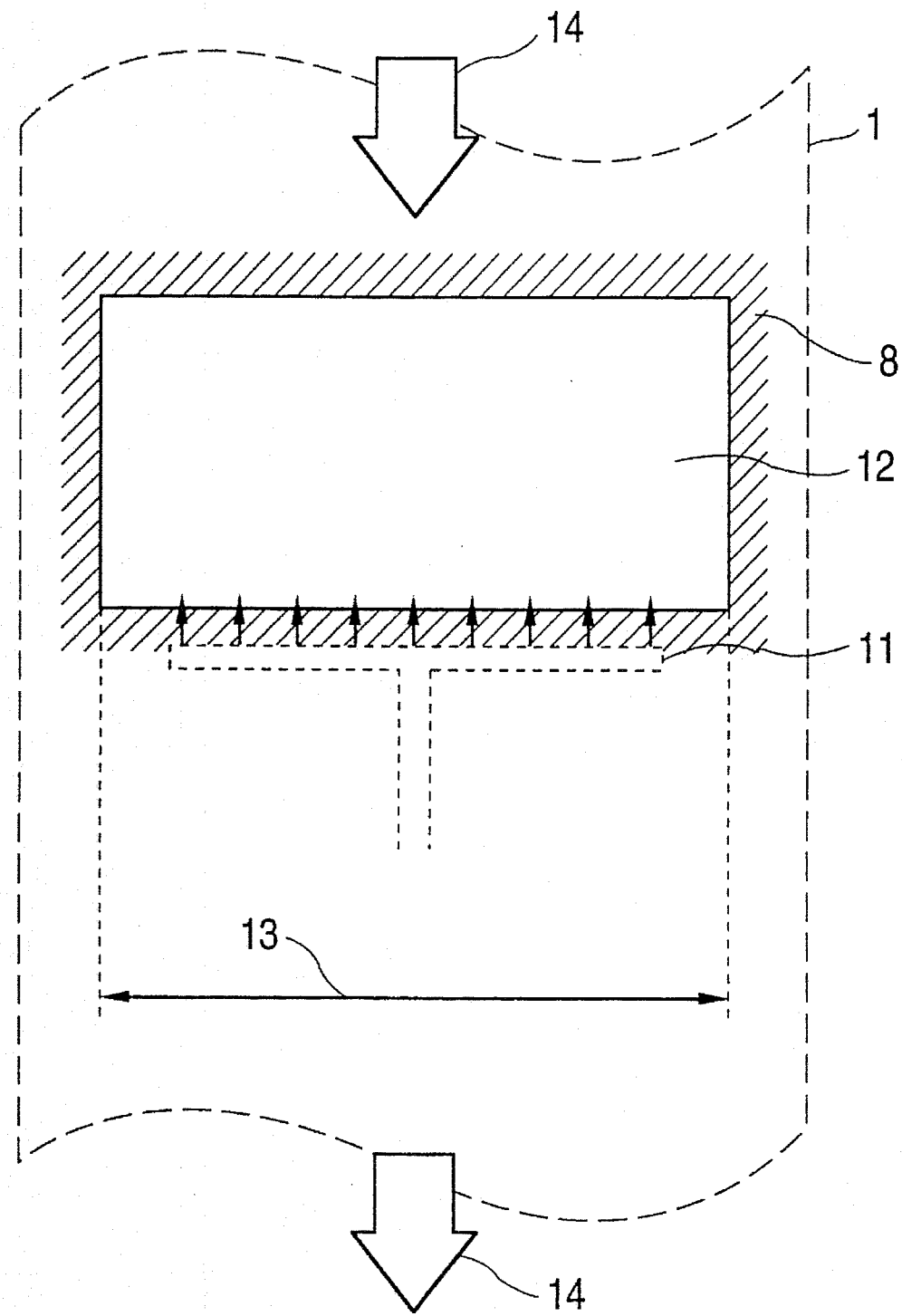
FIG. 14 shows another example of positioning of the polymer substrate, the shielding plate and the oxygen-supplying nozzle in the method for producing the magnetic tape according to the present invention.

According to the present invention, as shown in FIG. 13, the supplied amount of the oxygen gas near the edges of the magnetic layer-forming width 13 is made smaller than the center of the width 13, or as shown in FIG. 14, the oxygen gas is supplied in a width smaller than the width 13. In FIGS. 13 and 14, the length of arrow from the nozzle 14 corresponds to the supplied amount of oxygen gas.

To change the supplied amount of oxygen gas in the width direction as shown in FIG. 13, an opening area or a density of holes or slits through which the oxygen gas is jetted is made smaller in the regions near the edges of the magnetic layer-forming width 13 than in the center region. In FIG. 14, the holes or slits are provided in a width smaller than the magnetic layer-forming width 13, so that the reaching of the excessive oxygen gas to the deposition initiating point is greatly suppressed. Therefore, the structure of FIG. 14 is more preferable than that of FIG. 13.

In the above methods for supplying the oxygen gas, the magnetic characteristics may be deteriorated slightly in the edge parts of the magnetic layer-forming width 13, but the incident angle range in which the desired magnetic characteristics is obtained is widened.

The incident angle range in which the coercive force is at least 120 kA/m and the Mr*/Mr ratio is at least 0.9 is that, with the magnetic layer formed by the structure of FIG. 12, $\phi_i$ is from 70° to 85°, and $\phi_f$ is from 60° to 75°, while, with the magnetic layer formed by the structure of FIG. 14, $\phi_i$ is from 60° to less than 90°, and $\phi_f$ is from 50° to 75°. Herein, the initial incident angle $\phi_i$ of 90° means that the atom vapor is injected in the direction of the tangent line to the substrate plane. In the apparatus of FIG. 8, the initial incident angle $\phi_i$ of 90° is realized by removing a part of the shielding plate 8 on the deposition starting point side.

The currently commercially available thin film magnetic tape is produced by the above method in which the initial incident angle $\phi_i$ is 90°, but the Mr*/Mr cannot be at least 0.9, since the atom vapor is diffused near the range in which the initial incident angle is 90° so that many atoms are deposited at the incident angle smaller than 90° and the dispersion of the magnetic anisotropy is increased. To remove the influence of the diffused atoms, the distance between the shielding plate which regulates the incident angle at the deposition initiating point of the magnetic layer formation and the cylindrical can should be made sufficiently small, and preferably the initial incident angle $\phi_i$ is made smaller than 90° even very slightly. Accordingly, the expression that "$\phi_i$ being less than 90°" is used in connection with the present invention.

A percentage of the edge parts of the magnetic layer-forming width 13 in which the magnetic characteristics is deteriorated is decreased by the increase of the width 13. The positioning of the polymer substrate 1, the opening 12 of the shielding plate 8 and the oxygen-supplying nozzle 11 of FIG. 15 will more efficiently suppress the influence of the excessive oxygen gas.

Figure 15:
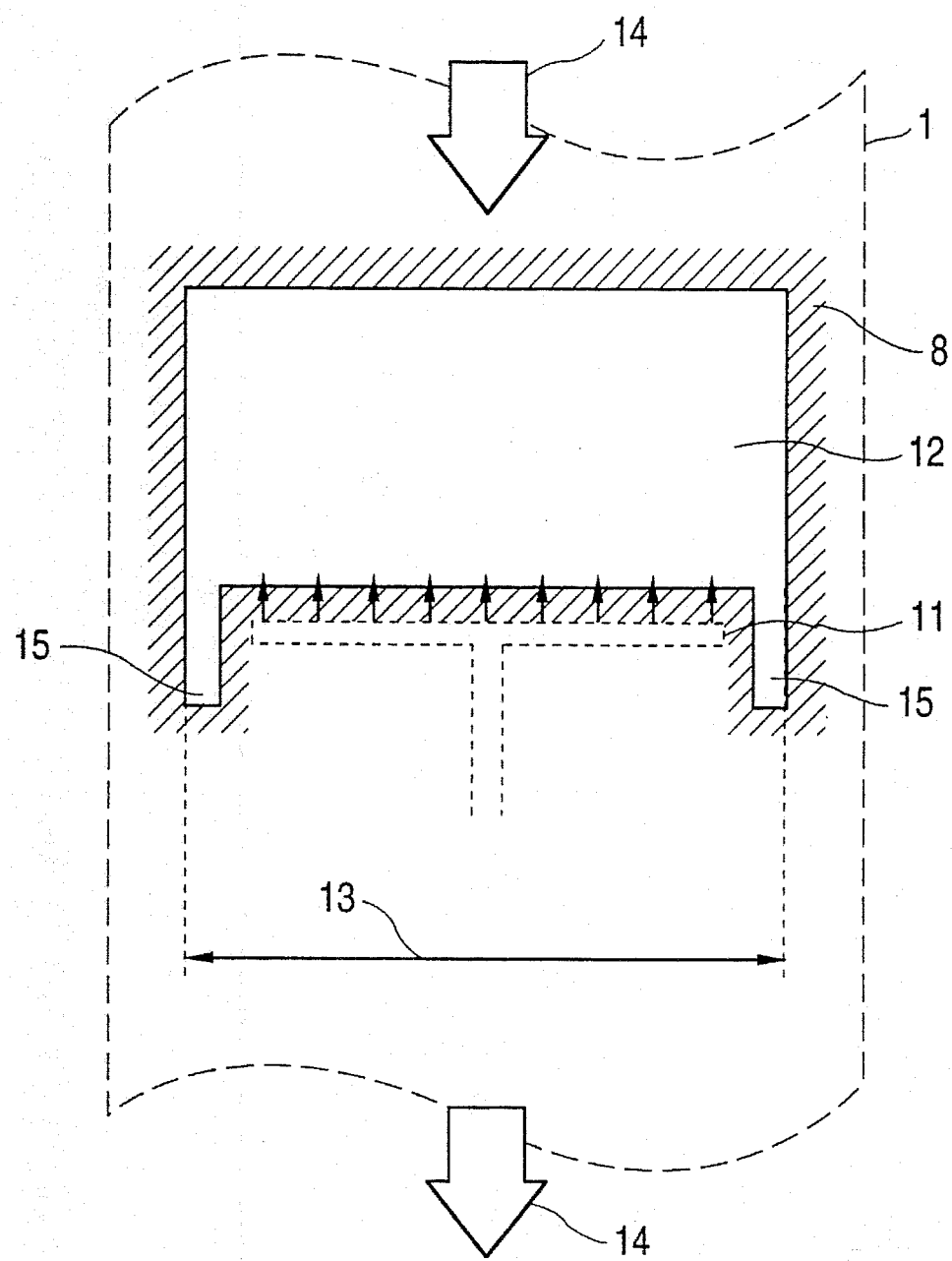
FIG. 15 shows a further example of positioning of the polymer substrate, the shielding plate and the oxygen-supplying nozzle in the method for producing the magnetic tape according to the present invention.

In the structure of FIG. 15, the cutout parts 15 are provided in the opening 12, and the atom vapor which passes the cutout parts 15 confines the excessive oxygen gas, so that the influence of the excessive oxygen gas on the magnetic layer formation at the deposition initiating point is suppressed.

What is important in the positioning of the polymer substrate 1, the opening 12 of the shielding plate 8 and the oxygen-supplying nozzle 11 is the distance between the deposition finishing point and the oxygen-supplying nozzle 11. When this distance is too large, the oxygen gas supplied from the nozzle 12 is diffused before it reaches the deposition finishing area, so that the control of the oxygen-supplying width or the oxygen-supplying amount profile in the substrate width direction becomes meaningless. A suitable distance between the deposition finishing point and the oxygen-supplying nozzle 11 varies with the size of the apparatus, an evacuation rate of the vacuum chamber, a position of an exhausting outlet, and the like, and is adjusted according to the design of each apparatus.

PREFERRED EMBODIMENTS OF THE INVENTION

The present invention will be illustrated in detail by the following Examples.

EXAMPLE 1

Using the apparatus of FIG. 8 in which the polymer substrate 1, the opening 12 of the shielding plate 8 and the oxygen-supplying nozzle 11 were placed as shown in FIG. 12, the magnetic layer 2 comprising Co and O (hereinafter referred to as "Co-O magnetic layer") was formed directly on the polymer substrate 1 made of polyethylene naphthalate having a thickness of 10 μm with changing each of the initial incident angles $\phi_i$ and $\phi_f$ by 5°. The magnetic tape had the cross sectional structure of FIG. 4A.

The temperature of the polymer substrate was kept at 30° C., and the thickness of the formed magnetic layer was 100 nm.

Figure 16:
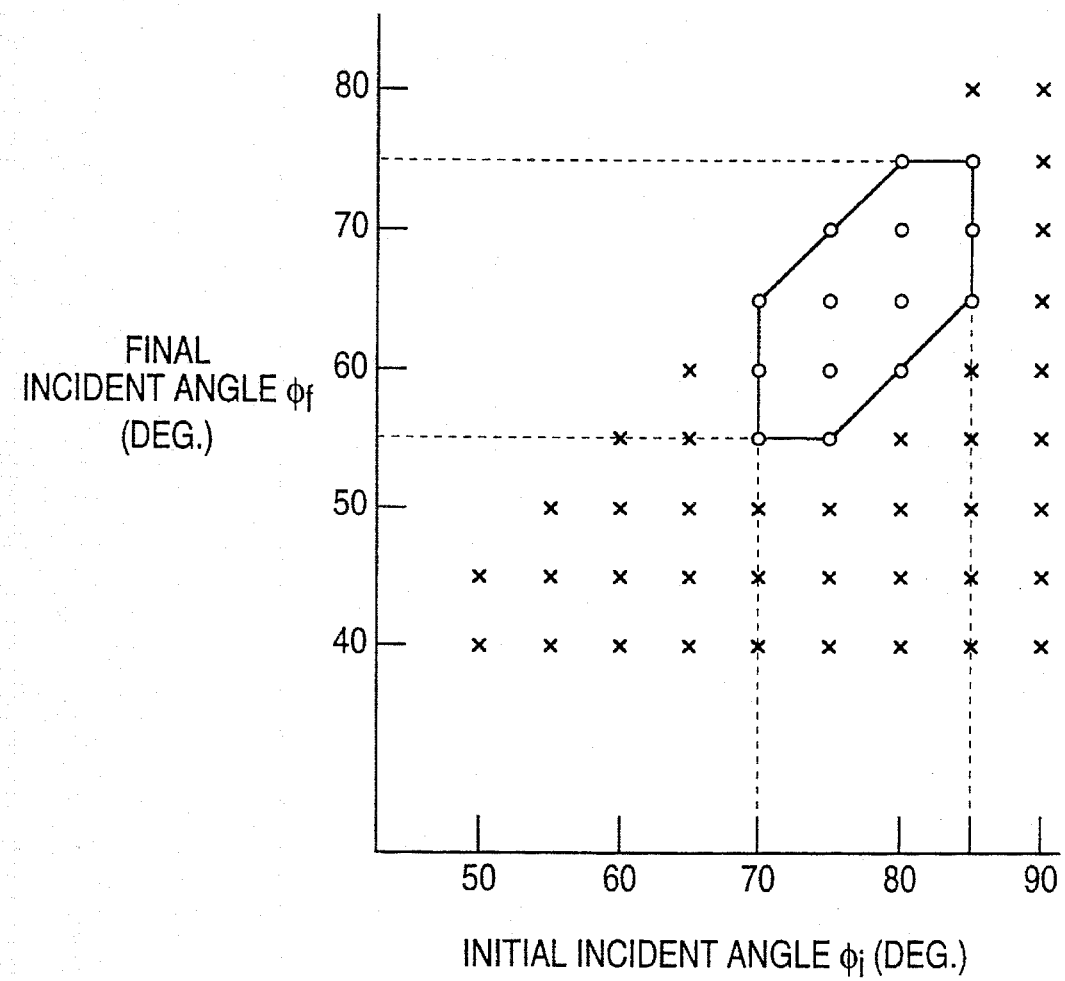
FIGS. 16 and 17 are graphs showing the relationships between the magnetic properties of the magnetic tapes and the incident angles of atom vapor during the formation of the magnetic layers.

The results are plotted in FIG. 16. The incident angle was expressed as an angle of the incident direction of the atom vapor from the normal line to the substrate (see FIG. 8). In FIG. 16, "O" indicates that the magnetic layer satisfied the coercive force Hc of at least 120 kA/m, the squareness ratio S of at least 0.9 and the Hs of not larger than 400 kA/m, while "X" indicates that the magnetic layer did not satisfy at least one of these three requirements.

From the results shown in FIG. 16, it is understood that, to produce the magnetic tape which satisfies the above three requirements, the initial incident angle $\phi_i$ should be in the range from 70° to 85°, and the final incident angle $\phi_f$ should be in the range from 55° to 75°. In these angle ranges, the difference between $\phi_i$ and $\phi_f$ is preferably as small as possible.

When the magnetic layer is formed under the above incident angle conditions, the magnetic anisotropy of the Co-O magnetic layer in its thickness direction may be decreased, so that the Hs may be reduced.

When the initial incident angle $\phi_i$ is larger than 85°, the magnetic layer contains an initial layer having a low metal content due to the high incident angle exceeding 85°. Since this initial layer has different magnetic anisotropy from that of other part of the magnetic layer which is formed at the incident angle less than 85°, the Hs is larger than 400 kA/m, and the squareness ratio S is smaller than 0.9. The currently commercially available thin film magnetic tapes may be of such type.

When the final incident angle $\phi_f$ is smaller than 55°, the surface part near the surface of the magnetic layer has the strong anisotropy in the vertical direction to the layer plane, so that the Hs is large, and both the coercive force Hc and the squareness ratio S are significantly deteriorated.

Many of the magnetic tapes shown in FIG. 16 did not satisfy the requirement that the Mr*/Mr ratio is at least 0.9.

Then, the Co-O magnetic layer was formed on the nonmagnetic CoO primer layer 4 which had been formed on the polymer substrate 1 made of polyethylene naphthalate having a thickness of 10 μm to produce the magnetic layer having the cross sectional structure of FIG. 5A. The thickness of the CoO primer layer was 30 nm.

The polymer substrate 1, the opening 12 of the shielding plate 8 and the oxygen-supplying nozzle 11 were placed as shown in FIG. 12, and each of the initial incident angles $\phi_i$ and $\phi_f$ was changed by 5°.

The temperature of the polymer substrate was kept at 30° C. both in the primer layer forming step and the magnetic layer forming step.

Figure 17:
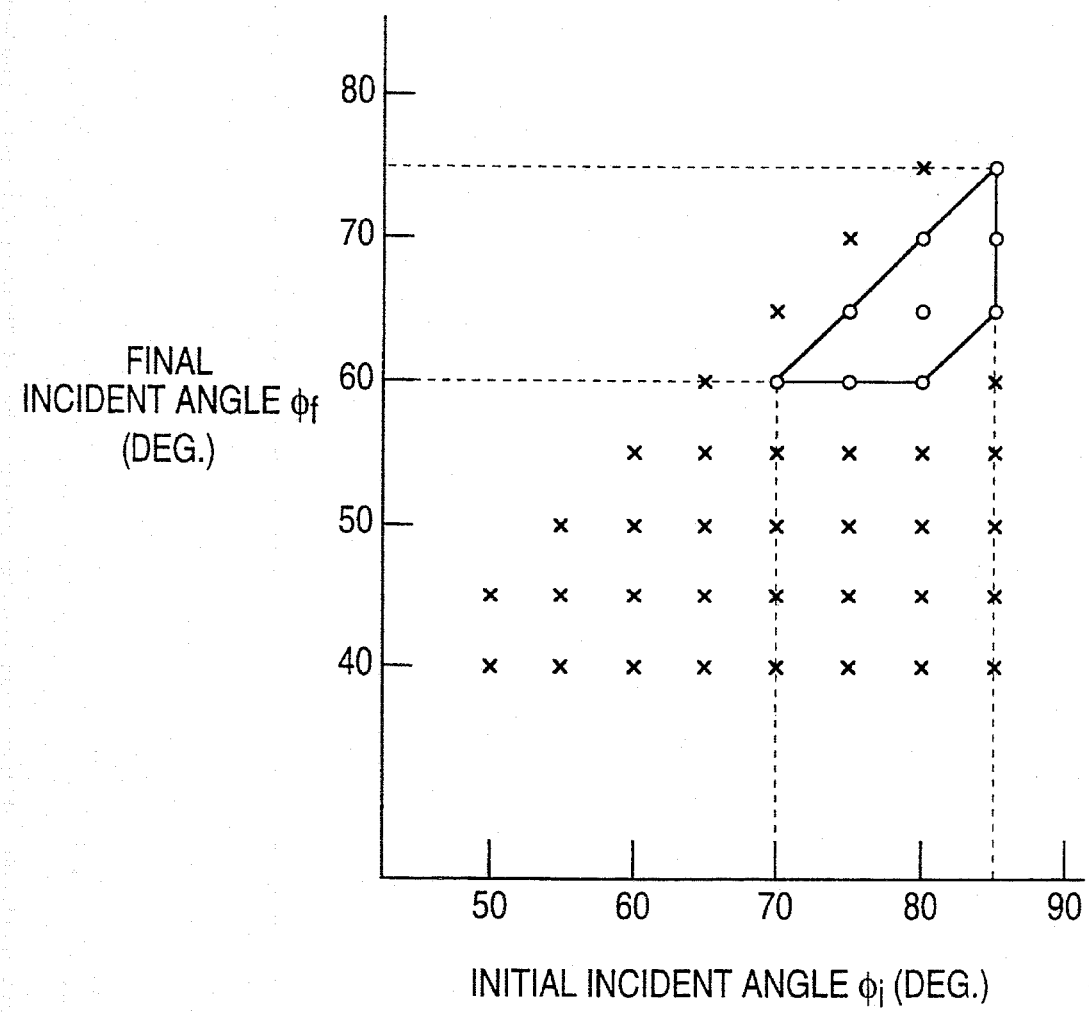

The results are plotted in FIG. 17, in which "O" indicates that the magnetic layer satisfied the coercive force Hc of at least 120 kA/m and the Mr*/Mr ratio of not larger than 0.9, while "X" indicates that the magnetic layer did not satisfied at least one of these requirements.

From the results shown in FIG. 17, it is understood that, to produce the magnetic tape which satisfies the above two requirements, the initial incident angle $\phi_i$ should be in the range from 70° to 85°, and the final incident angle $\phi_f$ should be in the range from 60° to 75°. In these angle ranges, the difference between them is preferably as small as possible as already described. With the apparatus according to this Example, when the difference between the initial incident angle and the final incident angle is less than 10°, the Mr*/Mr ratio is 0.9 or less.

Since the magnetic tape of the present invention is produced by forming the Co-O magnetic layer on the nonmagnetic CoO primer layer which has been formed on the polymer substrate at the above limited incident angle ranges, the dispersion of the magnetic anisotropy in the thickness direction may be further decreased, and the high Mr*/Mr ratio can be achieved.

Figure 18:
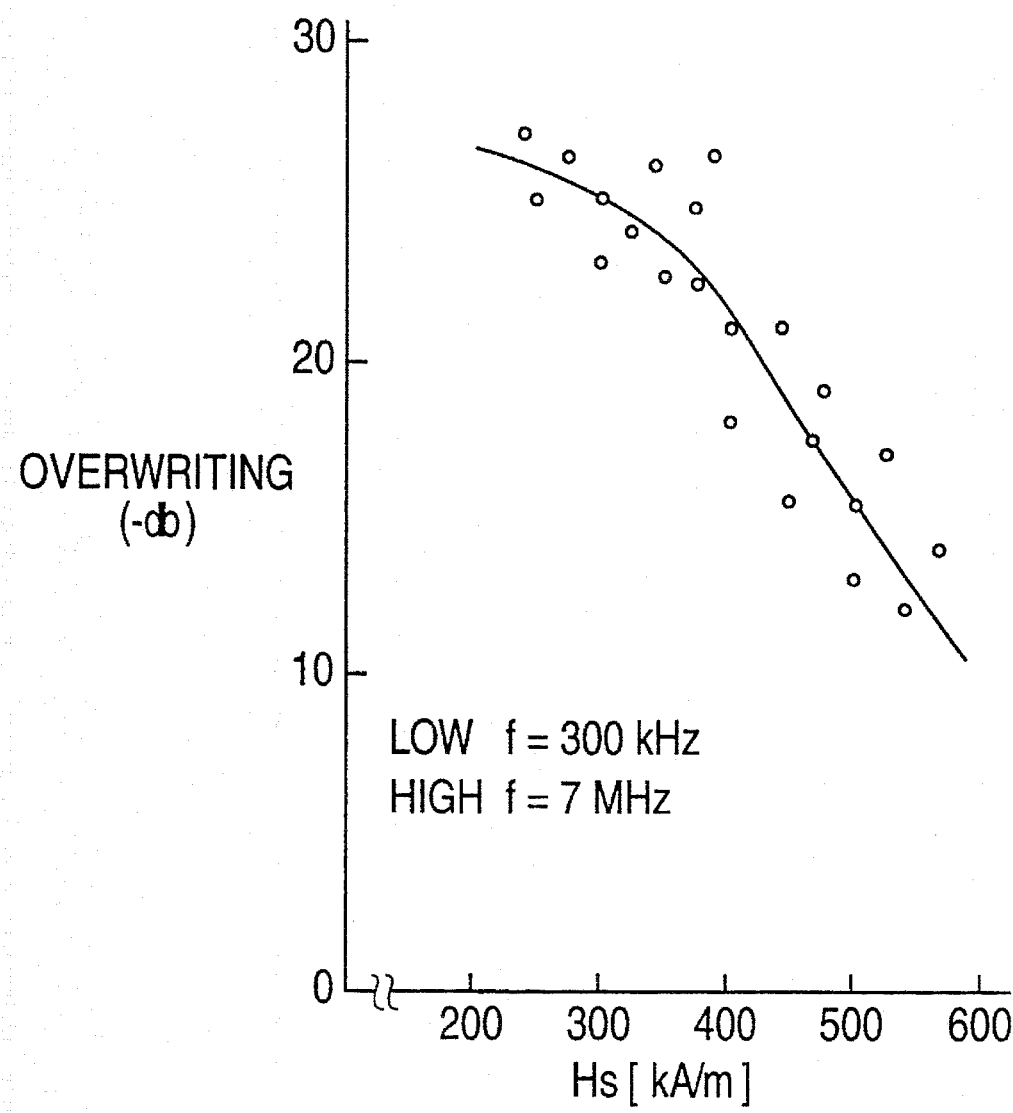
FIG. 18 is a graph showing the dependency of the overwriting property on the Hs.

FIG. 18 shows the relationship between the overwriting properties of the thin film magnetic tapes produced in the above and the Hs. The magnetic tapes included both the magnetic tapes having the structures of FIG. 4A and 5A.

The overwriting property was measured using a drum tester at a relative speed between the head and the magnetic tape of 3.8 m/sec. with a ring-type magnetic head having a saturation magnetic flux density of about 1 T and a gap length of about 0.2 μm.

FIG. 18 shows the decreased amount of the signal of 300 kHz (Low f), which was recorded on the demagnetized magnetic tape and overwritten by the signal of 7 MHz (High f). As the recording electric currents for the signals of 300 kHz and 7 MHz, the currents which could achieve the maximum output at 7 MHz recording were used.

From the results of FIG. 18, it is understood that the overwriting property exceeding 20 (−dB) was obtained in the Hs range of smaller than 400 kA/m, and it tended to saturate as the Hs decreases, while in the Hs range exceeding 400 kA/m, the overwriting property was heavily deteriorated as the Hs increased.

For reference, the overwriting property of the commercially available thin film magnetic tape having the magnetic layer comprising Co, Ni and O (Trade name "ME tape" manufactured by Sony) was measured in the same manner as described above, and it was from 13 to 16 (−dB).

The superiority of the magnetic tape according to the present invention to the conventional thin film magnetic tape in the overwriting property is significant when the pilot signal for tracking is used as the Low f signal, as seen from FIG. 18. When the high frequency signals having a wavelength of less than 1 μm are used as the Low f and High f signals, the overwriting property of the magnetic tape of the present invention is better than that of the conventional magnetic tape.

The tendencies shown in FIGS. 16, 17 and 18 are also obtained with the magnetic tape having the cross sectional structure of FIG. 4B or 5B which is produced by forming two magnetic layers at the same initial incident angle and the same final incident angle. The cross sectional structure of FIG. 4B or 5B has the slightly larger coercive force Hc than that of FIG. 4A or 5A, and the C/N ratio is improved by the decrease of the noise. The total thickness of the magnetic layers was the same in all the structures.

The tendencies shown in FIGS. 16, 17 and 18 are obtained by changing the production conditions such as the incident angles of the atom vapor, the saturation magnetization of the magnetic layer 2, the thicknesses of the magnetic layer 2 and the nonmagnetic CoO primer layer, the substrate temperatures in the steps for forming the magnetic layer and the primer layer, and the like, in practical ranges.

When the magnetic layer comprising Co, Ni and O (hereinafter referred to as "Co-Ni-O magnetic layer") is formed in place of the Co-O magnetic layer in the above method, the same tendencies are obtained.

When a small amount of an impurity is added to the magnetic layer to improve, for example, corrosion resistance, the excellent overwriting property is achieved, insofar as the coercive force is at least 120 kA/m, the squareness ratio is at least 0.9 and the Hs is not larger than 400 kA/m.

While the polyethylene naphthalate film was used as the substrate in this and subsequent Examples, it is possible in the present invention to use any of conventionally used substrate materials such as polyethylene terephthalate, polycarbonate, polyimide, polyamide, and the like. In the present invention, the kind of substrate material or the thickness of substrate is not critical. When the substrate is heated to a temperature higher than 80° C., the substrate material should be selected by taking generation of oligomers and/or heat resistance of the material into consideration.

EXAMPLE 2

In this Example, using the apparatus of FIG. 8 in which the polymer substrate 1, the opening 12 of the shielding plate 8 and the oxygen-supplying nozzle 11 were placed as shown in FIG. 15, the Co-O magnetic layer 2 was formed on the nonmagnetic CoO primer layer having the thickness of 15 nm which was formed on the polymer substrate 1 made of polyethylene naphthalate having a thickness of 10 μm with changing each of the initial incident angles $\phi_i$ and $\phi_f$ by 5°. The magnetic tape had the cross sectional structure of FIG. 5A.

The temperature of the polymer substrate was kept at 30° C. in the primer layer forming step, and at 80° C. in the magnetic layer forming step, and the thickness of the formed magnetic layer was 100 nm.

When the part of shielding plate which limited the incident angle at the deposition initiating point of the magnetic layer formation was removed and the initial incident angle was 90°, the magnetic characteristics was deteriorated due the adverse influence of the diffused atom vapor. To remove the influence of the diffused atom vapor, the shielding plate which limited the incident angle at the deposition initiating point of the magnetic layer formation was placed in a position that the initial incident angle $\phi_i$ was made slightly smaller than 90°, and the magnetic layer was formed.

Figure 19:
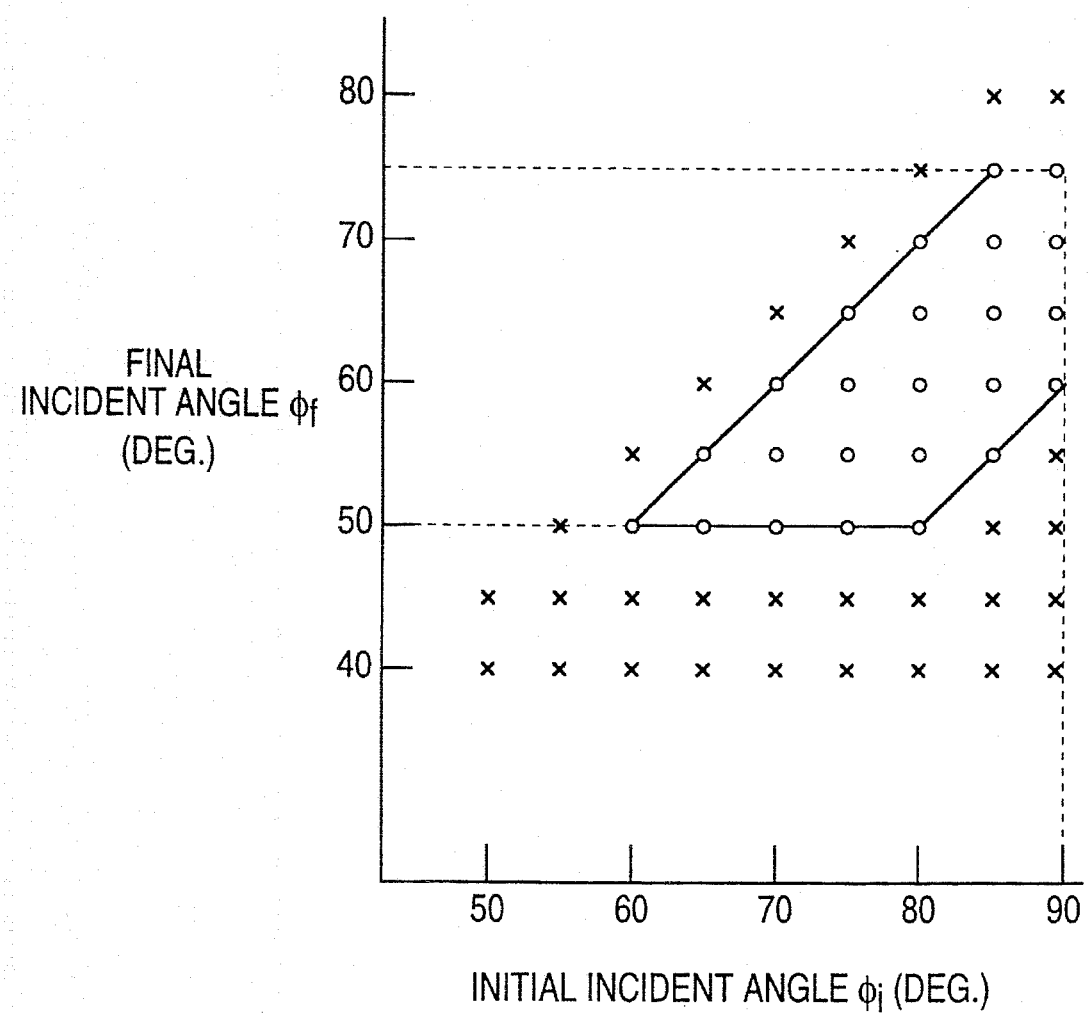
FIG. 19 is a graph showing the relationship between the magnetic properties of the magnetic tapes and the incident angles of atom vapor during the formation of the magnetic layers.

The results are plotted in FIG. 19, in which "O" indicates that the magnetic layer satisfied the coercive force Hc of at least 120 kA/m and the Mr*/Mr ratio of not larger than 0.9, while "X" indicates that the magnetic layer did not satisfied at least one of these requirements. From these results, it is understood that the incident angle range for producing the magnetic tapes satisfying the Mr*/Mr ratio of at least 0.9 was widened in comparison with the case of FIG. 17, and the initial incident angle $\phi_i$ was in the range from 60° to less than 90°, while the final incident angle $\phi_f$ was in the range from 50° to 75°.

Since the oxygen gas was supplied by the conventional manner in the production of the magnetic tapes plotted in FIG. 17, the excessive oxygen gas reached form the deposition finishing point to the deposition initiating point at which the incident angle was high, so that the suitable oxygen profile might not have been achieved in the thickness direction of the magnetic layer 2.

In the case of the magnetic layers plotted in FIG. 19, since the oxygen gas was supplied in the structure of FIG. 15, the amount of the excessive oxygen gas which reached the initial deposition area was greatly decreased, and further the substrate temperature was set at 80° C. in the magnetic layer formation step, whereby the incident angle range in which the desired magnetic characteristics were obtained was widened.

Figure 20:
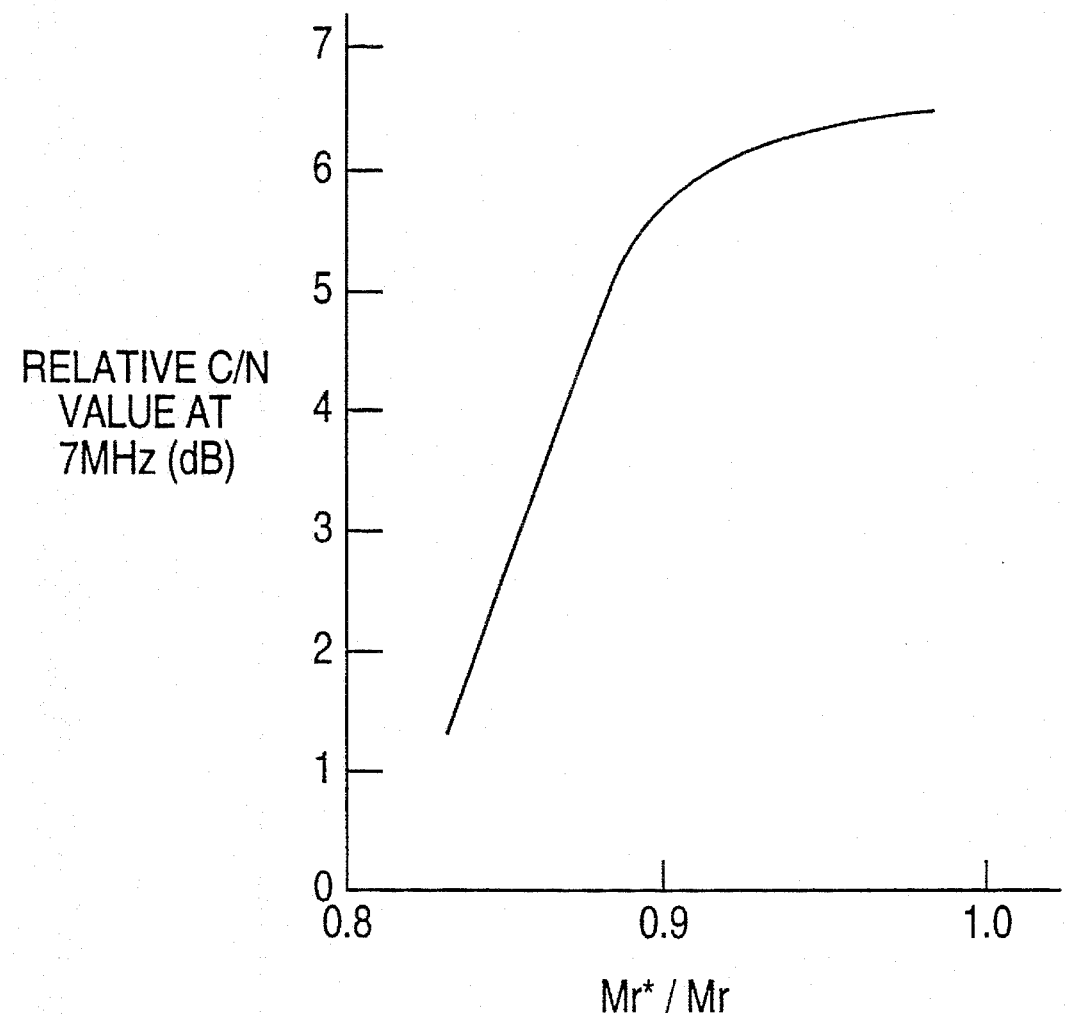
FIG. 20 is a graph showing the dependency of the C/N on the Mr*/Mr ratio.

FIG. 20 shows a relationship between the C/N and the Mr*/Mr ratio of the thin film magnetic tapes having the Co-O magnetic layer which have been discussed above.

The C/N characteristics of the magnetic tapes were measured using a drum tester at a relative speed between the head and the magnetic tape of 3.8 m/sec. with a ring-type magnetic head having a saturation magnetic flux density of about 1 T and a gap length of about 0.2 μm at a recording signal frequency of 7 MHz.

The C/N sharply increased as the Mr*/Mr ratio increased. Above the Mr*/Mr ratio of 0.9, the C/N gradually increased. From this result, the Mr*/Mr ratio was straightly reflected on the C/N characteristics of the magnetic tapes.

The tendencies shown in FIGS. 19 and 20 are obtained by changing the production conditions such as the incident angles of the atom vapor, the saturation magnetization of the magnetic layer 2, the thicknesses of the magnetic layer 2 and the nonmagnetic CoO primer layer, the substrate temperatures in the steps for forming the magnetic layer and the primer layer, and the like, in practical ranges.

Figure 21:
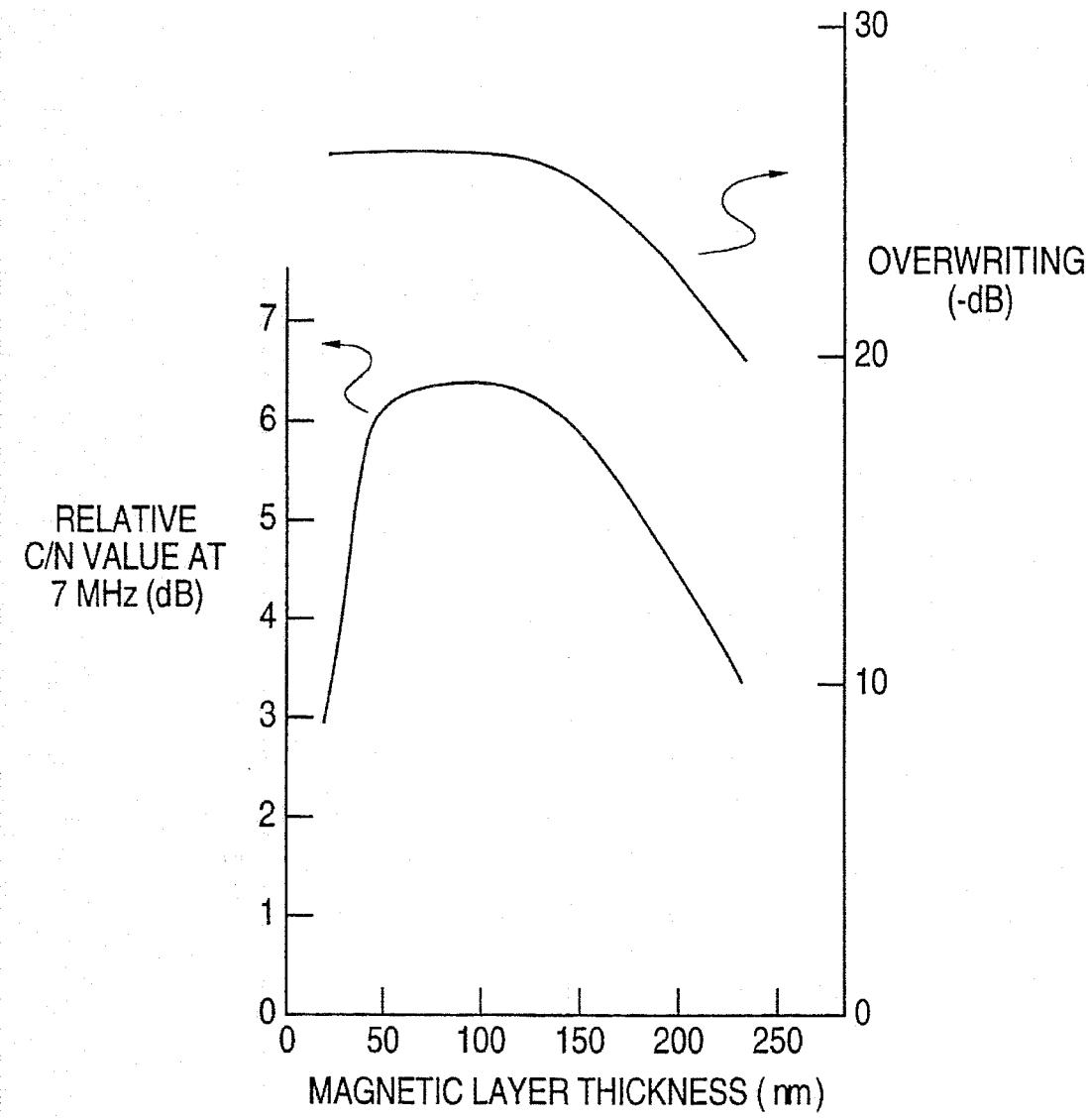
FIG. 21 is a graph showing the dependencies of the C/N and the overwriting property on the thickness of the magnetic layer.

FIG. 21 shows the dependency of the overwriting property and the C/N on the thickness of the Co-O magnetic layer at the recording signal frequency of 7 MHz measured by the drum tester with the magnetic tapes comprising the magnetic layer having the structure of FIG. 5A which was formed at the initial incident angle $\phi_i$ of 75° and the final incident angle $\phi_f$ of 60°. The thickness of the nonmagnetic CoO primer layer was about 30 nm. The overwriting was measured in the same manner as in Example 1. All the tested magnetic tapes satisfied the requirements of the present invention, that is, Hc of at least 120 kA/m, the squareness ratio in the plane of at least 0.9, the Hs of not larger than 400 kA/m, and the Mr*/Mr ratio of at least 0.9.

The increase of the C/N with the increase of the thickness of the magnetic layer at the thickness of 50 nm or less is due to the increase of the output. When the thickness of the magnetic layer exceeded 50 nm, the output tended to saturate while the noise increased, so that the C/N tended to decreased in the thickness range of 150 nm or larger, through the saturated region.

The overwriting property was substantially stable in the thickness region of 150 nm or less. But, when the thickness of the magnetic layer exceeded 150 nm, the overwriting property slightly deteriorated with the increase of the thickness of the magnetic layer. The same tendencies as those in FIG. 21 are seen with the magnetic tapes having no nonmagnetic CoO primer layer shown in FIG. 4.

In the present invention, the thickness of the Co-O magnetic layer is preferably from 50 nm to 150 nm in view of the recording/reproducing characteristics of the magnetic tape.

The tendencies shown in FIGS. 19, 20 and 21 are also obtained with the magnetic tape having, the cross sectional structure of FIG. 5B which is produced by forming two magnetic layers at the same initial incident angle and the same final incident angle. With such structure of the magnetic layer, the coercive force is slightly larger than that of the magnetic layer having the structure of FIG. 5A, and the C/N is improved because of the decrease of the noise as in Example 1.

While the above experiments used the Co-O magnetic layer, substantially the same results are obtained with the Co-Ni-O magnetic layer.

When a small amount of an impurity is added to the magnetic layer to improve, for example, corrosion resistance, the overwriting property and the excellent C/N characteristics in the high recording density region are achieved, insofar as the coercive force is at least 120 kA/m, the squareness ratio is at least 0.9, the Hs is not larger than 400 kA/m, an the Mr*/Mr ratio is at least 0.9.

EXAMPLE 3

In this Example, using the apparatus of FIG. 8 in which the polymer substrate 1, the opening 12 of the shielding plate 8 and the oxygen-supplying nozzle 11 were placed as shown in FIG. 15, the Co-O magnetic layer 2 was formed on the two nonmagnetic CoO primer layers which were formed on the polymer substrate 1 made of polyethylene naphthalate having a thickness of 10 μm with changing each of the initial and final incident angles $\phi_i$ and $\phi_f$ by 5°. The magnetic tape had the cross sectional structure of FIG. 6A.

For comparison, the magnetic tape having the cross sectional structure of FIG. 5A having the single nonmagnetic CoO primer layer was produced.

The temperature of the polymer substrate was kept at 30° C. in the primer layer forming step, and at 80° C. in the magnetic layer forming step, and the thickness of the formed magnetic layer was 100 nm.

In the formation step of the Co-O magnetic layer 2, the initial incident angle $\phi_i$ of the atom vapor was 75°, and the final incident angle $\phi_f$ was 60°.

Figure 6A:
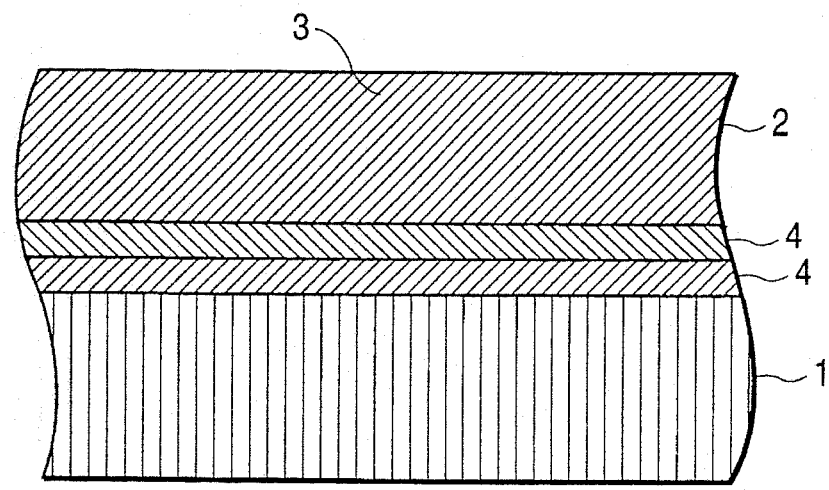
FIGS. 6A and 6B show further examples of cross sectional structures of the magnetic tapes according to the present invention.
Figure 22:
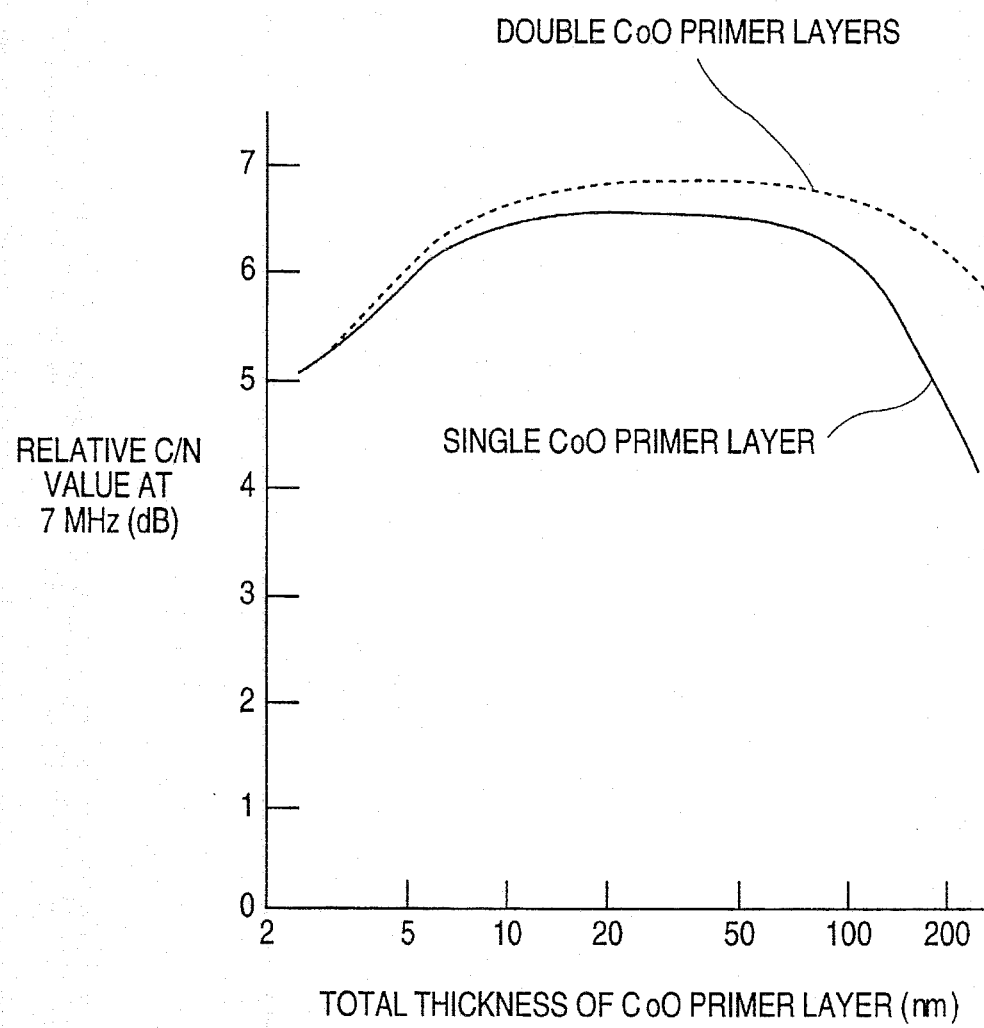
FIG. 22 is a graph showing the dependency of the C/N on the thickness of the nonmagnetic CoO primer layer.

FIG. 22 compares the C/N ratios at the recording signal frequency of 7 MHz of the magnetic tapes having the structures of FIG. 6A and those having the structure of FIG. 5A, when the thickness of the nonmagnetic primer layer(s) was changed while the thickness of the Co-O magnetic layer was constant at 100 nm. The C/N was measured using the drum tester in the same manner as in previous Example. With the magnetic tapes having the structure of FIG. 6A, the thickness of the primer layers was the total thickness of the two primer layers.

With the magnetic tapes having the structure of FIG. 5A having the single nonmagnetic CoO primer layer, the C/N decreased at the primer thickness of about 5 nm or less and about 100 nm or larger. At the thin primer layer region, the effect of improving the crystallinity in the initially formed region of the magnetic layer was not achieved. At the thick primer layer region, there was found no problem in the magnetic properties, while the noise increased due to the deterioration of the surface properties of the primer layer, so that the C/N was decreased. Consequently, to achieve the high C/N ratio, the thickness of the nonmagnetic CoO primer layer is preferably from 5 nm to 100 nm.

With the magnetic tapes having the structure of FIG. 6A having the double nonmagnetic CoO primer layers, the same tendency as the structure of FIG. 5A was found with the C/N. That is, the C/N decreased at the total primer thickness of about 5 nm or less and about 100 nm or larger.

In comparison with the structure having the single nonmagnetic CoO primer layer, the C/N increased remarkably as the total thickness of the primer layers increased. At the total primer thickness of about 100 nm or larger, the C/N was less decreased than in the structure having the single primer layer. When the nonmagnetic CoO primer layer has the double layer structure, the surface properties of the primer layer is less deteriorated, so that the noise increase is slightly suppressed.

Figure 6B:
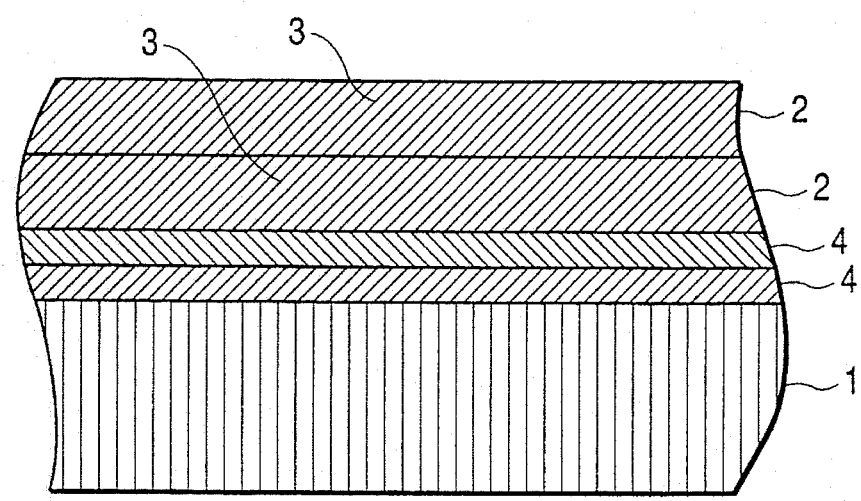

The tendencies shown in FIG. 22 are also obtained with the magnetic tapes having the cross sectional structures of FIGS. 5B and 6B which are produced by forming two magnetic layers at the same initial incident angle and the same final incident angle. With such structure of the magnetic layer, the coercive force is slightly larger than that of the magnetic layer having the structure of FIG. 5A or 6A, and the C/N is improved because of the decrease of the noise as in Example 2.

While the above experiments used the Co-O magnetic layer, substantially the same results are obtained with the Co-Ni-O magnetic layer.

From the results of Examples 1, 2 and 3, it is understood that the overwriting properties and the C/N in the high recording density region of the magnetic tape having the magnetic tape comprising Co, O and optionally Ni are improved by realizing the novel two requirements, namely the Hs of not larger than 400 kA/m and preferably the Mr*/Mr ratio of at least 0.9.

According to the experiments by the present inventor, it was found that the C/N of the magnetic tape according to the present invention was better than that of the commercially available magnetic tape having the magnetic layer comprising Co, Ni and O by +7 dB and +3 dB at the recording wavelength of 0.5 μm and 4 μm, respectively. To stably achieve the high C/N in a wide wavelength range, preferably the coercive force Hc is at least 140 kA/m and the Mr*/Mr ratio is at least 0.95.

What is claimed is:

1. A magnetic tape comprising a polymer substrate and a magnetic layer which is formed directly on a surface of said substrate or which is formed on a nonmagnetic under layer formed on said substrate, wherein said magnetic layer is in-plane anisotropic having an axis of easy magnetization which slants from a normal line to a plane of said magnetic layer towards a longitudinal direction of the tape, wherein said magnetic layer comprises cobalt, oxygen and optionally nickel, and wherein said magnetic tape is characterized by having (i) a coercive force of at least 120 kA/m, (ii) a squareness ratio of at least 0.9 in a hysteresis loop which is obtained when a magnetic field is applied in a plane of said magnetic layer in a longitudinal direction of the magnetic tape, and (iii) on the hysteresis loop, an intensity of the applied magnetic field, at which a magnetization when the applied magnetic field is increased is 99% of the magnetization when the applied magnetic field is decreased, of net larger than 400 kA/m.

2. The magnetic tape according to claim 1, wherein a thickness of said magnetic layer is from 50 nm to 150 nm.

3. A magnetic tape comprising a polymer substrate, a nonmagnetic under layer which comprises CoO having an atomic ratio of 1:1, and a magnetic layer which is formed on said under layer and comprises cobalt, oxygen and optionally nickel, wherein said magnetic layer is in-plane anisotropic having an axis of easy magnetization which slants from a normal line to a plane of said magnetic layer towards a longitudinal direction of the tape, and wherein said magnetic tape is characterized by having (i) a coercive force of at least 120 kA/m in a hysteresis loop which is obtained when a magnetic field is applied in a plane of said magnetic layer in a longitudinal direction of the magnetic tape, (ii) on the hysteresis loop, a ratio of a value of magnetization at an intersection between a tangential line drawn at a point which gives a residual magnetization at the applied magnetic field of 0 (zero) and a tangential line drawn at a point which gives a coercive force with a magnetization of 0 in a second quadrant to said residual magnetization of at least 0.9, and (iii) on the hysteresis loop, an intensity of the applied magnetic field, at which a magnetization when the applied magnetic field is increased is 99% of the magnetization when the applied magnetic field is decreased, of not larger than 400 kA/m.

4. The magnetic tape according to claim 3, wherein a thickness of said magnetic layer is from 50 nm to 150 nm.

5. The magnetic tape according to claim 3, wherein a thickness of said under layer is from 5 nm to 100 nm.

6. The magnetic tape according to claim 5, having a uniaxial anisotropy constant of at least 0.23 J/cm$^3$.

* * * * *